US008127981B1

(12) United States Patent
Kraft et al.

(10) Patent No.: US 8,127,981 B1
(45) Date of Patent: Mar. 6, 2012

(54) BANKING SYSTEM CONTROLLED RESPONSIVE TO DATA BEARING RECORDS

(75) Inventors: Dave Kraft, North Canton, OH (US); Daniel Schoeffler, Twinsburg, OH (US); Mark A. Douglass, North Canton, OH (US); Richard C. Lute, Jr., Mogadore, OH (US)

(73) Assignee: Diebold Self-Service Systems division of Diebold, Incorporated, North Canton, OH (US)

(*) Notice: Subject to any disclaimer, the term of this patent is extended or adjusted under 35 U.S.C. 154(b) by 618 days.

(21) Appl. No.: 12/231,889

(22) Filed: Sep. 5, 2008

Related U.S. Application Data

(60) Provisional application No. 60/967,854, filed on Sep. 7, 2007, provisional application No. 60/967,838, filed on Sep. 7, 2007, provisional application No. 60/967,778, filed on Sep. 7, 2007.

(51) Int. Cl.

| | |
|---|---|
| ***G06Q 40/00*** | (2006.01) |
| ***G06Q 10/00*** | (2006.01) |
| ***G07D 11/00*** | (2006.01) |
| ***G07F 19/00*** | (2006.01) |
| ***G06K 5/00*** | (2006.01) |
| ***G06K 7/08*** | (2006.01) |

(52) U.S. Cl. ........... 235/379; 235/380; 235/381; 705/28

(58) Field of Classification Search .......... 235/379–381; 705/28

See application file for complete search history.

(56) References Cited

U.S. PATENT DOCUMENTS

| | | | | |
|---|---|---|---|---|
| 5,642,922 | A * | 7/1997 | Ramachandran et al. | 312/7.2 |
| 5,954,439 | A * | 9/1999 | Brannan et al. | 400/621 |
| 6,024,027 | A * | 2/2000 | Esmaili | 109/50 |
| 6,082,616 | A * | 7/2000 | Lewis et al. | 235/379 |
| 6,962,285 | B2 * | 11/2005 | Douglass et al. | 235/379 |
| 7,032,245 | B2 * | 4/2006 | Scarafile et al. | 235/380 |
| 7,093,751 | B2 * | 8/2006 | Wang | 235/379 |
| 7,156,296 | B2 * | 1/2007 | Magee et al. | 235/379 |
| 7,377,424 | B2 * | 5/2008 | Douglass et al. | 235/379 |
| 7,735,722 | B1 * | 6/2010 | Lute et al. | 235/379 |
| 7,782,600 | B2 * | 8/2010 | MacDonald | 361/679.21 |
| 7,810,715 | B2 * | 10/2010 | Herd et al. | 235/379 |
| 7,938,317 | B1 * | 5/2011 | Lute et al. | 235/379 |
| 2002/0073032 | A1 * | 6/2002 | Holmes et al. | 705/43 |
| 2003/0074316 | A1 * | 4/2003 | McCallum | 705/43 |
| 2004/0084522 | A1 * | 5/2004 | Peebles et al. | 235/379 |
| 2004/0184861 | A1 * | 9/2004 | Knobel | 400/611 |
| 2004/0222295 | A1 * | 11/2004 | Magee et al. | 235/381 |
| 2005/0010525 | A1 * | 1/2005 | Ross et al. | 705/43 |
| 2009/0195993 | A1 * | 8/2009 | Herd | 361/724 |

* cited by examiner

*Primary Examiner* — Daniel Walsh

(74) *Attorney, Agent, or Firm* — Ralph E. Jocke; Daniel D. Wasil; Walker & Jocke

(57) ABSTRACT

An automated banking machine operates responsive to data bearing records. The machine includes a housing, a card reader in operatively-supported connection with the housing and operative to read indicia on user cards corresponding to financial accounts, a display in operatively-supported connection with the housing, and a cash dispenser in operatively-supported connection with the housing. The machine further includes a fascia movably mounted in operatively-supported connection with the housing and a journal printer assembly mounted to the fascia. The journal printer assembly includes a vertically arranged print head, a paper supply, and a paper take-up.

27 Claims, 34 Drawing Sheets

BANKING SYSTEM CONTROLLED RESPONSIVE TO DATA BEARING RECORDS

CROSS REFERENCE TO RELATED APPLICATION

This Application claims benefit pursuant to 35 U.S.C. §119(e) of Provisional Application Ser. Nos. 60/967,854; 60/967,838; and 60/967,778 filed Sep. 7, 2007 the disclosures of each of which are incorporated herein by reference.

TECHNICAL FIELD

This invention relates to automated banking machines that operate response to data read from user cards and which may be classified in U.S. Class 235, Subclass 379.

BACKGROUND ART

Automated banking machines may include a card reader that operates to read data from a bearer record such as a user card. The automated banking machine may operate to cause the data read from the card to be compared with other computer stored data related to the bearer. The machine operates in response to the comparison determining that the bearer is an authorized system user to carry out at least one transaction which is operative to transfer value to or from at least one account. A record of the transaction is also commonly printed through operation of the automated banking machine and provided to the user. A common type of automated banking machine used by consumers is an automated teller machine which enables customers to carry out banking transactions. Banking transactions carried out may include the dispensing of cash, the making of deposits, the transfer of funds between account and account balance inquiries. The types of banking transactions a customer can carry out are determined by the capabilities of the particular banking machine and the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of service provider transactions. For purposes of this disclosure an automated banking machine or an ATM shall be deemed to include any machine that may be used to electronically carry out transactions involving transfers of value.

Automated banking machines may benefit from improvements.

OBJECTS OF EXEMPLARY EMBODIMENTS

It is an object of an exemplary embodiment to provide an automated banking machine.

It is a further object of an exemplary embodiment to provide an automated banking machine that has an attractive appearance.

It is a further object of an exemplary embodiment to provide an automated banking machine which is more readily serviced.

It is a further object of an exemplary embodiment to provide an automated banking machine which is more readily manufactured.

It is a further object of an exemplary embodiment to provide an automated banking machine which requires less space for servicing.

It is a further object of an exemplary embodiment to provide an automated banking machine which provides improved access for servicing of internal components.

Further objects of exemplary embodiments will be made apparent in the following Detailed Description of Exemplary Embodiments and the appended claims.

The foregoing objects are accomplished in an exemplary embodiment by an automated banking machine which includes a top housing bounding an interior area. The top housing defines a front opening to the interior area. The top housing is mounted above a secure enclosure which is alternatively referred to herein as a chest or safe.

The top housing houses upper banking machine components which may include, for example, a display, a card reader, a receipt printer, a keypad, controllers, actuators, sensors, and others. As used herein "keypad" means input keys whether arranged in a keypad arrangement, keyboard arrangement, or otherwise, and the designations are interchangeable unless expressly identified as being used in a restricted manner. The chest houses lower banking machine components which may include, for example, a currency dispenser mechanism, a currency stacker, and others.

The exemplary automated banking machine includes an upper fascia adapted to selectively cover the front opening. The upper fascia includes a rearwardly extending projection which selectively overlies a forward region of the top housing adjacent the front opening to provide an attractive appearance to the machine. In one embodiment, the upper fascia is movable from a first position where the upper fascia covers the front opening, and a second position where the fascia is disposed away from the front opening.

In one exemplary embodiment, a rollout tray is movably mounted in supporting connection with the top housing. Several of the upper banking machine components may be supported on the rollout tray. Additionally, the upper fascia may be mounted to the rollout tray. The rollout tray is movable between a retractable position where the rollout tray is in the interior area and an extended position where the rollout tray extends from the front opening. When the rollout tray is in the retracted position, the upper fascia selectively covers the front opening. When the rollout tray is in the extended position, the banking components mounted thereon may be more readily serviced.

In one exemplary embodiment, a processor case housing the primary processor for the automated transaction machine, is rotationally mounted in supporting connection with the chest. The processor case is adapted for rotational movement between an operational position and a service position. In the operational position, a first functional side of the processor case faces a side wall of the top housing. In the service position, the first functional side of the processor case faces a front opening of the top housing.

In one exemplary embodiment, a rollout tray, supporting several upper banking machine components, is movable from a retracted position to an extended position to allow the processor case to rotate into the service position. In the service position, cables, connections, and other components, including one or more processors, are accessible for servicing.

In another exemplary embodiment, a top housing cover is mounted in slidable supporting relationship with the chest housing. Several upper banking machine components may be supported on a mounting tray equipped with side flanges. The top housing cover may include channel members for slidable engagement with the side flanges. The upper banking machine components may be accessed for servicing by rearwardly sliding the top housing cover. A plurality of fasteners and/or locking mechanisms may be employed to secure the top housing cover in an operational position. Alternately, the mounting tray may include channel members for slidable engagement with flange members carried on the top housing cover.

In a further exemplary embodiment, an automated banking machine includes a housing, a card reader in operatively-supported connection with the housing, the card reader operative to read indicia on user cards corresponding to financial accounts, a display in operatively-supported connection with the housing, and a cash dispenser in operatively-supported connection with the housing. The exemplary embodiment further includes a fascia, wherein the display is viewable through an opening in the fascia, and wherein the fascia is movably mounted in operatively-supported connection with the housing, and a journal printer assembly mounted in operatively-supported connection with the fascia and including, in combination, a print head, a paper supply, and a paper take-up. The fascia may be further movable between a closed position adjacent the housing and an away position at least partially separated from the housing. The fascia may be operatively supported by the housing through two horizontally-disposed members, which members may be bayonet slides.

The journal printer assembly may be mounted in a vertical orientation in which the paper take-up, which may comprise a paper take-up roll, optionally including a tensioner, and the paper supply, which may comprise a paper roll, optionally including a paper supply roll tensioner, are in an above-and-below relation with the print head. The print head, which may be a thermal print head used in combination with paper thermally actuatable, such as thermochromic paper, is operative to print indicia representative of automated banking machine status data, automated banking machine financial transactions data, or combinations thereof. The journal printer assembly may further comprise a journal printer housing adapted to house the print head, the paper supply, and the paper take-up. The journal printer housing may further comprise an aperture or window positioned to enable access to one or more input devices that can cause journal printer functions. Such functions may include, but are not limited to, paper advance and paper run out. The printer may also include one or more status indicators, which indicate conditions such as out-of-paper, paper jam, and paper tear, or combinations thereof. Such access through the aperture may include, but not limited to, direct manual access, access with tools, specialized or otherwise, or visual access, such as viewing indicators, such as status lights or light emitting diodes (LEDs).

The fascia may further comprise a fascia panel, the fascia panel formed to include a fascia panel aperture or window positioned relative to the journal printer housing aperture to enable access to journal printer functions.

In a further exemplary embodiment, the fascia includes at least one journal printer assembly support bracket first portion, for example, a horizontal channel or a keyhole channel, and the journal printer assembly includes at least one support bracket second portion, for example, an assembly extension or a key, respectively. The bracket first portion and the bracket second portion cooperate to operatively support the journal printer assembly on the fascia.

An exemplary automated banking machine may further include a receipt printer mounted in operatively-supported connection with the fascia with the journal printer mounted above the receipt printer.

In accordance with a further exemplary embodiment, a method is provided comprising the steps of mounting a housing in supporting connection with a chest adapted for use in an automated banking machine, the chest defining a secure area and housing at least a portion of a currency dispenser mechanism. The housing includes a card reader in operatively-supported connection with the housing, the card reader operative to read indicia on user cards corresponding to financial accounts, a display in operatively-supported connection with the housing, and a cash dispenser in operatively-supported connection with the housing. The exemplary embodiment further includes mounting a fascia to the housing, the display viewable through an opening in the fascia, and the fascia movably mounted in operatively-supported connection with the housing, and mounting a journal printer assembly to the fascia, the journal printer assembly mounted in operatively-supported connection with the fascia, and including a print head, a paper supply, and a paper take-up.

In a further exemplary embodiment, the step of mounting the journal printer assembly to the fascia further comprises mounting the journal printer in a vertical orientation, wherein the paper take-up is positioned above the print head and the paper supply is positioned below the print head.

In a still further exemplary embodiment, the fascia includes at least one journal printer assembly support bracket first portion, the journal printer assembly includes at least one support bracket second portion, and the step of mounting the journal printer assembly to the fascia further comprises engaging the at least one support bracket second portion with the journal printer assembly support bracket first portion.

In a still further exemplary embodiment, the journal printer assembly includes a journal printer housing, the journal printer housing formed to include an aperture, the aperture positioned to enable access to journal printer functions and the fascia includes a fascia panel, wherein the fascia panel is formed to include a fascia panel aperture, the method further comprising aligning the journal printer housing aperture and the fascia panel aperture, wherein access to journal printer functions is enabled.

In accordance with a further exemplary embodiment, a method is provided comprising the steps of moving a fascia away from a housing of an automated banking machine, the automated banking machine including a card reader operative to read indicia on user cards corresponding to financial accounts and a cash dispenser in operatively-supported connection with the housing and, subsequently, servicing a journal printer assembly operatively supported on the fascia.

In a further exemplary embodiment, the step of servicing the journal printer assembly comprises installing a paper supply roll, removing a paper take-up roll, adjusting a printer head, clearing a paper jam, adjusting a paper roll tensioner, inspecting indicia of journal printer assembly operation, or combinations thereof.

In a further exemplary embodiment, the journal printer assembly includes a journal printer housing, the journal printer housing formed to include an aperture, the aperture positioned to enable access to journal printer functions, the method comprising accessing journal printer functions through the journal printer housing aperture.

In a further exemplary embodiment, the fascia includes a fascia panel, the fascia panel formed to include an aperture, the aperture positioned to enable access to journal printer functions, the method comprising accessing journal printer functions through the fascia panel aperture.

In a further exemplary embodiment, the method further comprises demounting and separating the journal printer assembly from the fascia. In a still further exemplary embodiment, the method further comprises mounting the journal printer assembly onto the fascia.

The above-described embodiments allow ready access to the banking machine components for servicing, as well as simplifying the manufacturing and/or assembly process. The principles described may be applied to numerous ATM configurations.

DETAILED DESCRIPTION OF EXEMPLARY EMBODIMENTS

Figure 1:
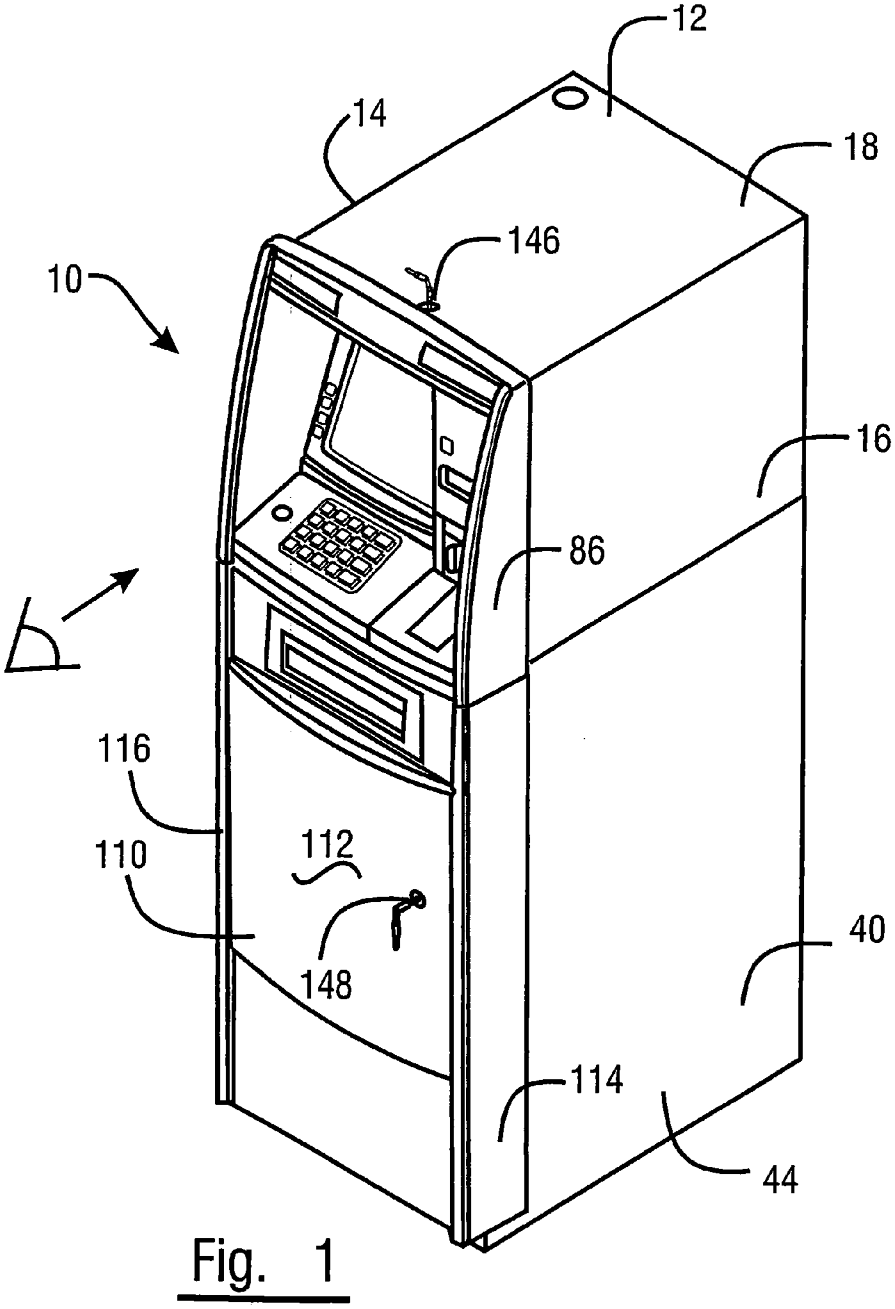
FIG. 1 is an isometric view of an automated banking machine of an exemplary embodiment.
Figure 2:
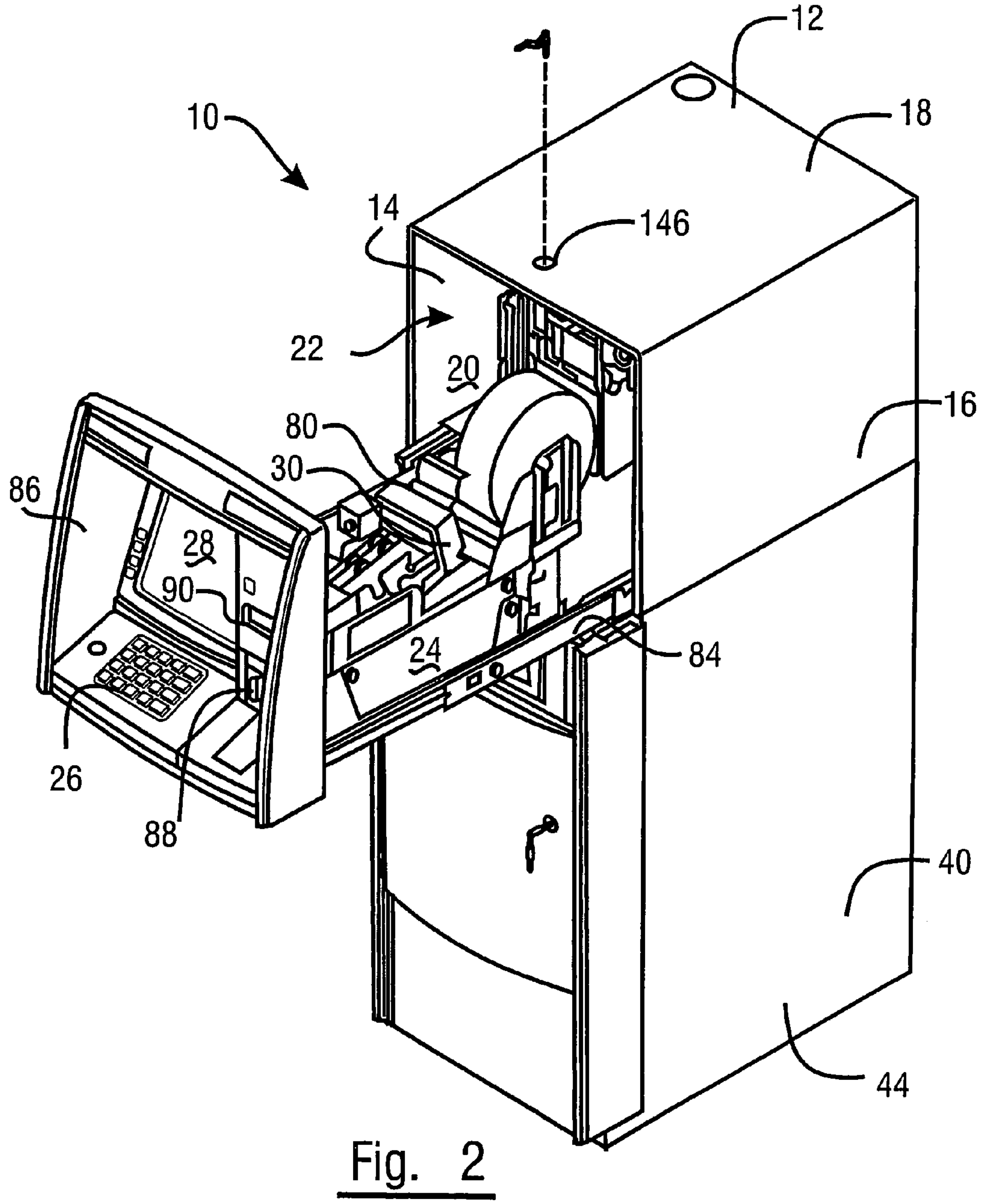
FIG. 2 is an isometric view of the automated banking machine of FIG. 1 with a rollout tray extended.

Referring now to the drawings, and particularly to FIGS. 1-2, there is shown therein an automated banking machine of a first exemplary embodiment, generally indicated 10. In this exemplary embodiment, automated banking machine 10 is an automated transaction machine (ATM). ATM 10 includes a top housing 12 having side walls 14 and 16, and top wall 18. Housing 12 encloses an interior area indicated 20. Housing 12 has a front opening 22. In this exemplary embodiment, the rear of housing 12 is closed by a rear wall 19, shown in FIG. 7. However, in other embodiments, the rear of housing 12 may be accessible through an access door or similar device.

Top housing 12 is used to house certain banking machine components such as input and output devices.

Figure 3:
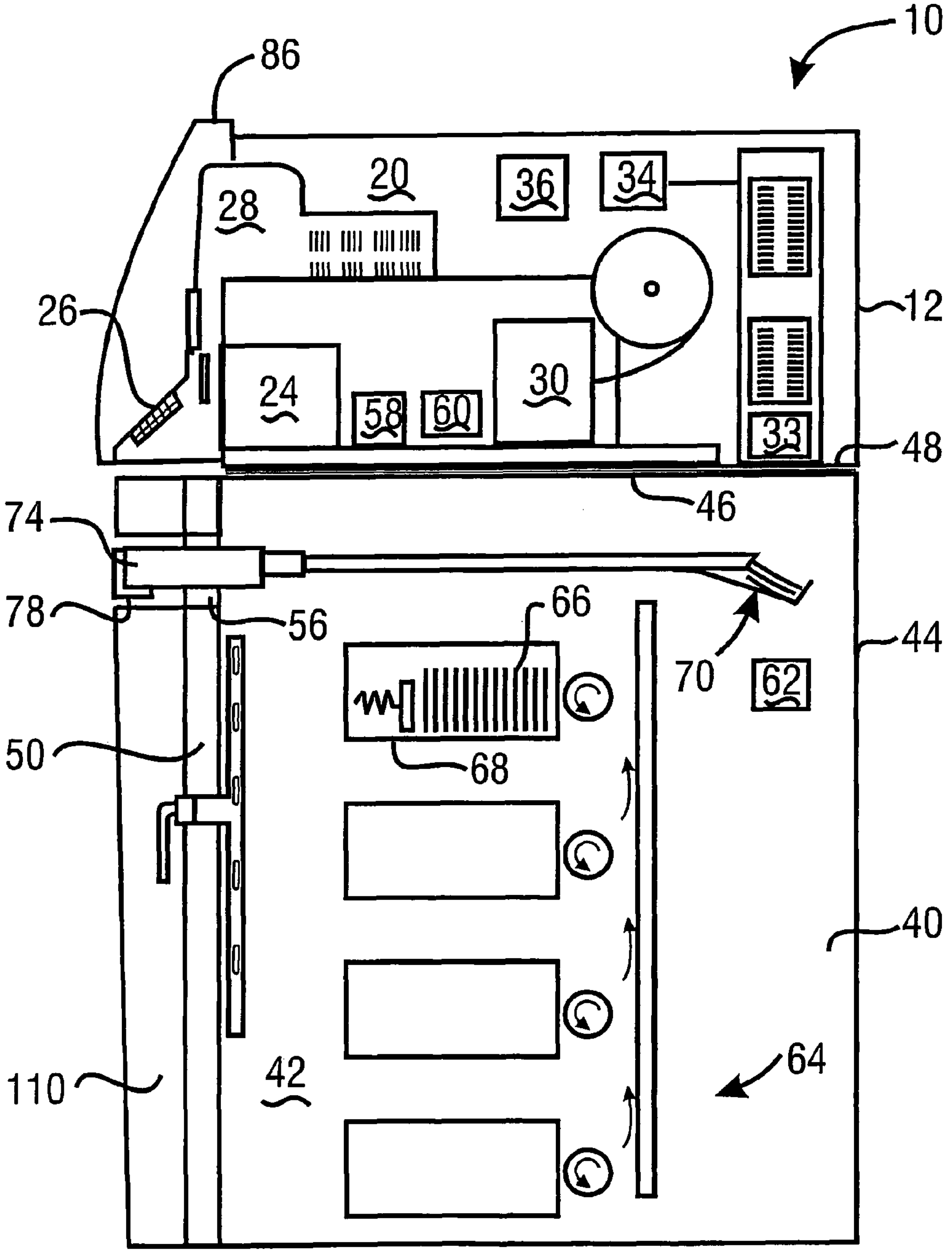
FIG. 3 is a side schematic view of an automated banking machine illustrating various banking machine components.

With reference to FIG. 3, in this exemplary embodiment the input devices include a card reader schematically indicated 24. Card reader 24 is operative to read a customer's card which includes information about the customer thereon, such as the customer's account number. In some embodiments the card reader 24 may be a card reader adapted for reading magnetic stripe cards and/or so called "smart cards" which include a programmable memory. Another input device in the exemplary embodiment includes input keys 26. Input keys 26 may in embodiments, be arranged in a keypad or keyboard. Input keys 26 may alternately or in addition include function keys or other types of devices for receiving manual inputs. It should be understood that in various embodiments other types of input devices may be used such as biometric readers, speech or voice recognition devices, inductance type readers, IR type readers, and other devices capable of communicating with a person, article or computing device, radio frequency type readers and other types of devices which are capable of receiving information that identifies a customer and/or their account.

The exemplary embodiment of machine 10 also includes output devices providing outputs to the customer. In the exemplary embodiment machine 10 includes a display 28. Display 28 may include an LCD, CRT or other type display that is capable of providing visible indicia to a customer. In other embodiments output devices may include devices such as audio speakers, RF transmitters, IR transmitters or other types of devices that are capable of providing outputs which may be perceived by a user either directly or through use of a computing device, article or machine. It should be understood that embodiments may also include combined input and output devices such as a touch screen display which is capable of providing outputs to a user as well as receiving inputs.

The exemplary embodiment of the automated banking machine 10 also includes a receipt printer schematically indicated 30. The receipt printer is operative to print receipts for users reflecting transactions conducted at the machine. Embodiments may also include other types of printing mechanisms such as statement printer mechanisms, ticket printing mechanisms, check printing mechanisms and other devices that operate to apply indicia to media in the course of performing transactions carried out with the machine.

Automated banking machine 10 further includes one or more processors schematically indicated 33. Processor 33, alternately referred to as a computer or a controller, is in operative connection with at least one memory or data store which is schematically indicated 34. The processor 33 is operative to carry out programmed instructions to achieve operation of the machine in accomplishing transactions. The processor 33 is in operative connection with a plurality of the transaction function devices included in the machine.

The exemplary embodiment includes at least one communications device 36. The communications device 36 may be one or more of a plurality of types of devices that enable the machine to communicate with other systems and devices for purposes of carrying out transactions. For example, communications device 36 may include a modem for communicating messages over a data line or wireless network, with one or more other computers that operate to transfer data representative of the transfer of funds in response to transactions conducted at the machine. Alternately the communications device 36 may include various types of network interfaces, line drivers or other devices suitable to enable communication between the machine 10 and other computers and systems.

ATM 10 further includes a safe or chest 40 enclosing a secure area 42. Secure area 42 is used in the exemplary embodiment to house critical components and valuable documents. Specifically in the exemplary embodiment secure area 42 is used for housing currency, currency dispensers, currency stackers, and other banking machine components. Chest 40 includes a chest housing 44 including a top wall 46 having an upper surface 48 outside of the secure area 42. Top housing 12 is supported on the chest 40 such that the secure area 42 is generally below the interior area 20.

Chest 40 also includes a chest door 50 that is movably mounted in supporting connection with the housing. Chest door 50, shown in the closed position in FIG. 4 and in an open condition in FIG. 5, is generally closed to secure the contents of the chest 40. In this exemplary embodiment, the chest door 50 is used to close a first opening 52 at a first end 54 of the chest housing 44. In other embodiments the chest opening and door may have other configurations. In the exemplary embodiment, chest door 50 includes a first device opening 56 therethrough and cooperates with mechanisms inside and outside the chest for passing currency or other items between a customer and devices located inside the chest 40.

Referring again to FIG. 3, machine 10 also includes a plurality of sensing devices for sensing various conditions in the machine. These various sensing devices are represented schematically by component 58 for simplicity and to facilitate understanding. It should be understood that a plurality of sensing devices is provided in the machine for sensing and indicating to the processor 33 the status of devices within the machine.

Automated banking machine 10 further includes a plurality of actuators schematically indicated 60 and 62. The actuators may comprise a plurality of devices such as motors, solenoids, cylinders, rotary actuators and other types of devices that are operated responsive to the processor 33. It should be understood that numerous components within the automated banking machine are operated by actuators positioned in operative connection therewith. Actuators 60 and 62 are shown to schematically represent such actuators in the machine and to facilitate understanding.

Machine 10 further comprises at least one currency dispenser mechanism 64 housed in secure area 42. The currency dispensing mechanism 64 is operative responsive to the processor 33 to pick currency sheets from a stack of sheets 66 housed in one or more canisters 68. The picked currency sheets may be arranged by a currency stacker mechanism 70 for presentation through a delivery mechanism 74 which operates to present a stack of note or other documents to a customer.

When chest door 50 is in the closed position, at least an end portion of a sheet delivery mechanism 74 extends through first opening 56 in the chest door 50. In response to operation of the processor 33, when a desired number of currency sheets have been collected in a stack, the stack is moved through delivery mechanism 74.

As the sheets are moved through delivery mechanism 74 toward the first opening 56, the controller 32 operates a suitable actuating device to operate a gate 78 so as to enable the stack of sheets to pass outward through the opening. As a result the user is enabled to receive the sheets from the machine. After a user is sensed as having removed the stack from the opening, the controller may operate to close the gate 78 so as to minimize the risk of tampering with the machine.

With reference to FIG. 2, in this exemplary embodiment, ATM 10 further includes a rollout tray 80. Rollout tray 80 is movably mounted in supporting connection with slides 84. The slides 84 enable movement of the rollout tray 80 between the extended position shown in FIG. 2 and a retracted position within the interior area 20 of the top housing 12. Rollout tray 80 in the exemplary embodiment may be similar to that shown in U.S. Pat. No. 6,082,616, the disclosure of which is incorporated by reference as if fully rewritten herein.

Rollout tray 80 may have several upper banking machine components supported thereon including card reader 24, input keys 26, display 28, receipt printer 30, and other components as appropriate for the particular ATM 10.

This exemplary embodiment further includes an upper fascia 86 in supporting connection with rollout tray 80. The upper fascia 86 may include user interface openings such as a card opening 88 through which a customer operating the machine 10 may insert a credit, debit or other card, or a receipt delivery slot 90 through which printed transactions receipts may be delivered to the customer. Rollout tray 80 movably supports upper fascia 86 relative to the top housing 12 so that upper fascia 86 is movable between a first position covering the front opening and a second position in which the upper fascia is disposed from the front opening 22.

As illustrated in FIG. 1, in the operative condition of ATM 10, the rollout tray 80 is retracted into the interior area 20 of the housing 12. Upper fascia 86 operates to close front opening 22 and provide an attractive appearance for ATM 10, while allowing a customer to input information and receive outputs from ATM 10.

Figure 6:
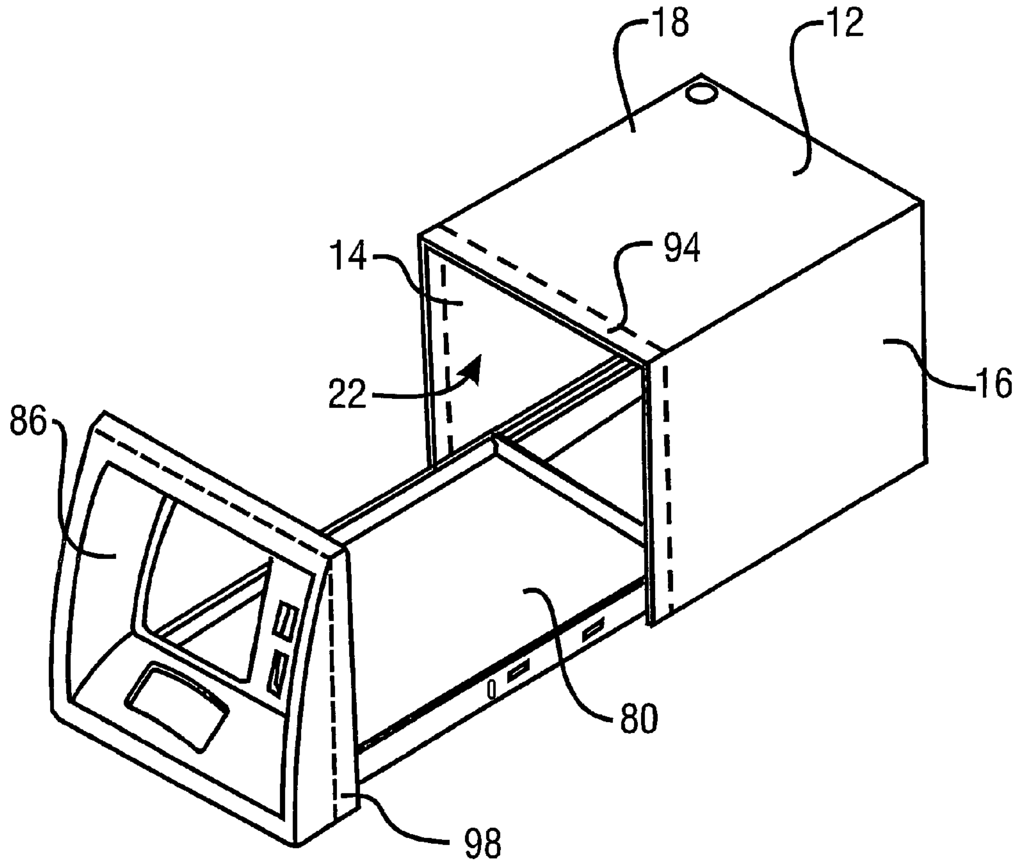
FIG. 6 is an isometric view of a top housing for an automated banking machine supporting a rollout tray in an extended position.

With reference to FIG. 6, in this exemplary embodiment, the forward-most parts of side walls 14 and 16 and top wall 18 of housing 12 define a forward region 94, shown in dashed lines, bounding the front opening 22. In this exemplary embodiment, upper fascia 86 includes a rearwardly extending portion 98, also shown in dashed lines. Rearwardly extending portion 98 is dimensioned to overlie in generally surrounding relation, the forward region 94 when rollout tray 80 is retracted and upper fascia 86 is in the first position. In some embodiments the rearwardly extending portion may be contoured or tapered so as to extend further inwardly with increasing proximity to the front of the fascia. Such tapered control may engage and help to close and/or align the fascia and the top housing 12.

Figure 7:
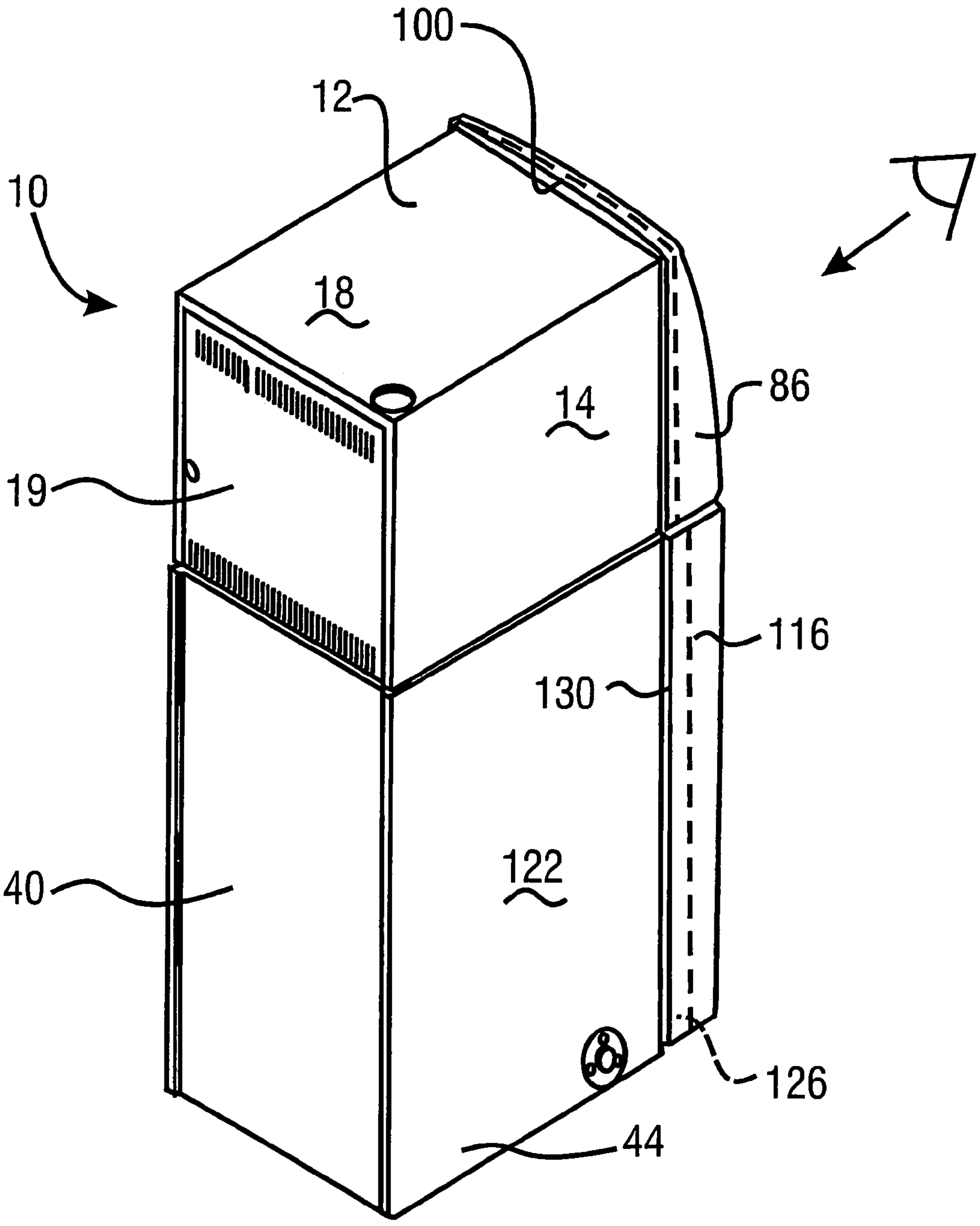
FIG. 7 is an isometric rear view of the automated banking machine of FIG. 1.

With reference to FIG. 7, when ATM 10 is viewed from the rear, there may be a first gap 100 separating the rearwardly extending portion 98 of upper fascia 86 from the top housing 12. In some applications it may be desirable that first gap 100 be minimal to prevent unauthorized access to interior area 20. First gap 100 in the exemplary embodiment is not visible when ATM 10 is viewed from the front.

In this exemplary embodiment, the upper fascia 86 is formed of a plastic material and the top housing 12 is formed of sheet metal. Alternately, the extending portion 98 or forward portion 94 shown in FIG. 6, or both, may include resilient materials to provide for engagement and sealing of the housing and the fascia in the closed position. However, other materials may be chosen, and these approaches are exemplary.

Figure 4:
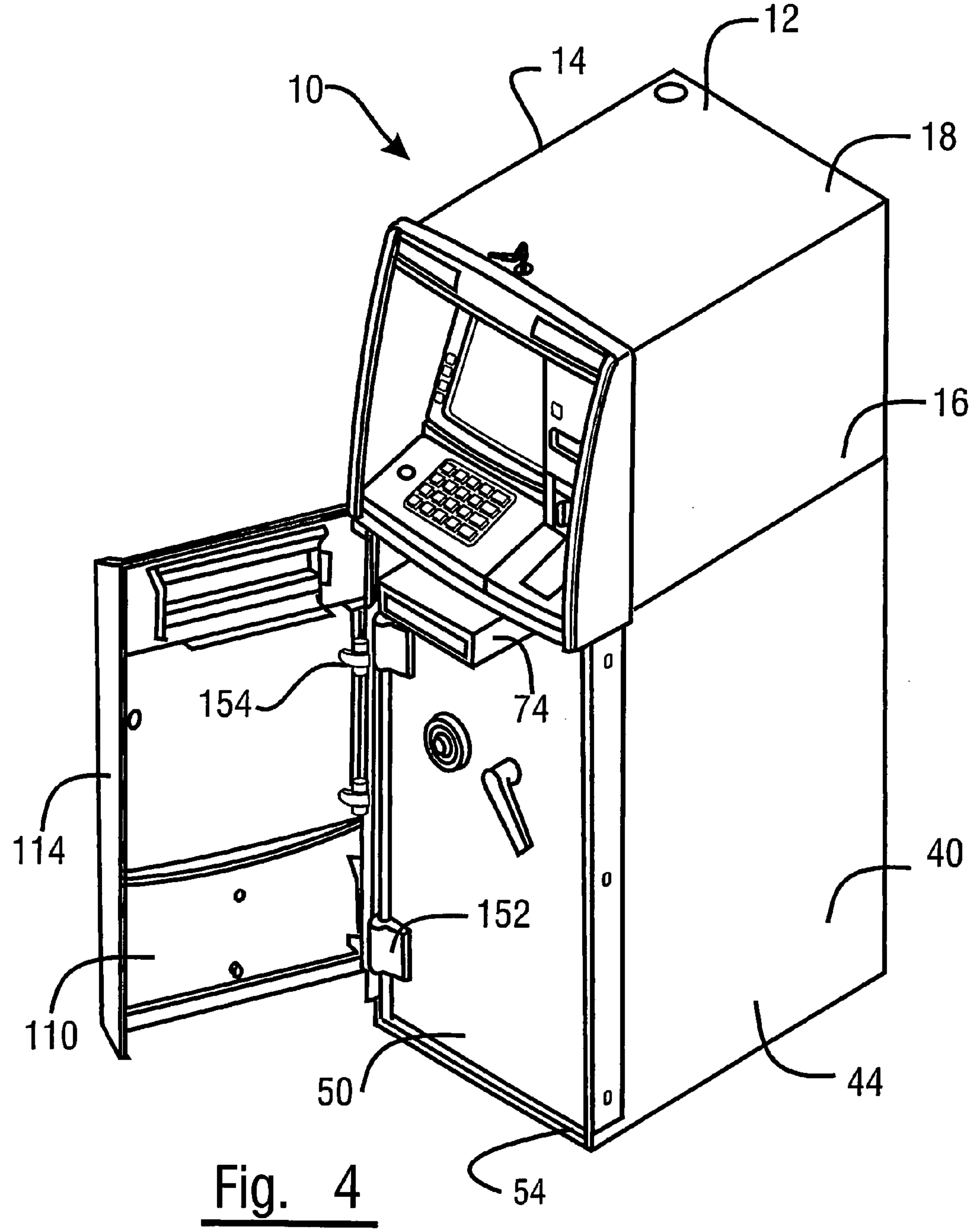
FIG. 4 is an isometric view of the automated banking machine of FIG. 1 with a lower fascia in an accessible position.
Figure 5:
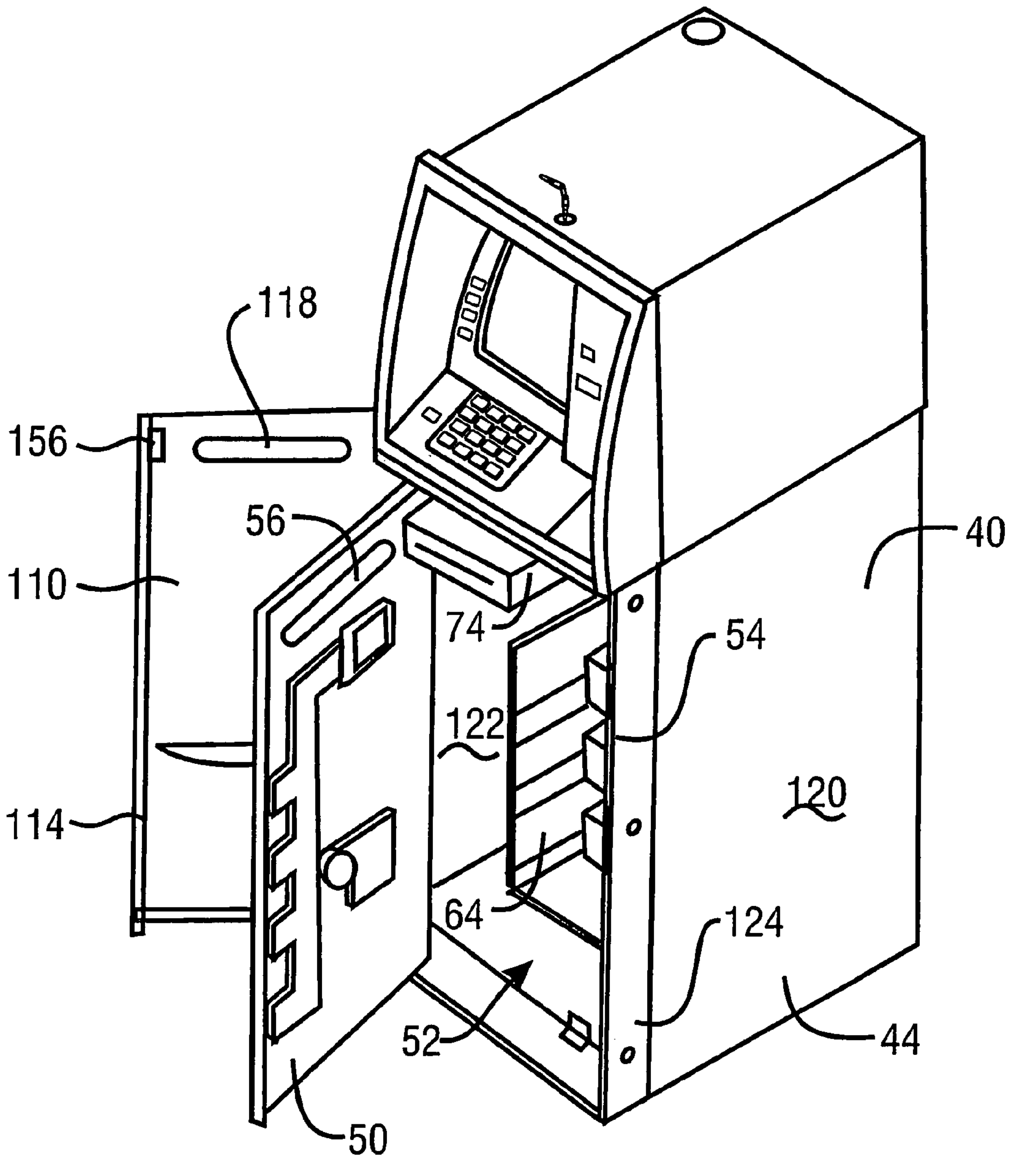
FIG. 5 is an isometric view of the automated banking machine of FIG. 1 with a lower fascia in an accessible position and a chest door in an open position.

With reference to FIGS. 1, 4 and 5, the exemplary embodiment further includes a lower fascia 110 movably mounted on the chest housing 44. In this exemplary embodiment, lower fascia 110 is operable to move between a covering position as illustrated in FIG. 1, and an accessible position as illustrated in FIGS. 4-5. In other applications, it may be preferable to provide a selectively removable lower fascia, or other approaches to supporting the lower fascia on the chest portion.

The exemplary lower fascia 110 operates to cover the chest 40 to thereby provide a more attractive appearance to ATM 10. In the exemplary embodiment, lower fascia 110 includes a front face 112 and first and second side extensions 114, 116, respectively.

In the exemplary embodiment, illustrated in FIGS. 5 and 7, chest housing 44 includes first and second side walls 120, 122, respectively. First side wall 120 includes a forward portion 124 and second side wall includes a forward portion 126 (shown in phantom in FIG. 7). When the chest door 50 is in the closed position and the lower fascia 110 is in the covering position, the first and second side extensions 114, 116, respectively, overlie forward portions 124, 126.

Thus, when ATM 10 is viewed from the front (see FIG. 1), the lower fascia 110 covers the chest 40 from side to side. When ATM 10 is viewed from the rear (see FIG. 7), a lower gap (not shown) between the first side extension 114 and the first side wall 120 of the chest housing 44 and a lower gap 130 between the second side extension and 116 the second side wall 122 may be visible, although such lower gaps are not viewable from the front of ATM 10. In some applications, it may be desirable to minimize the lower gaps 130.

Figure 8:
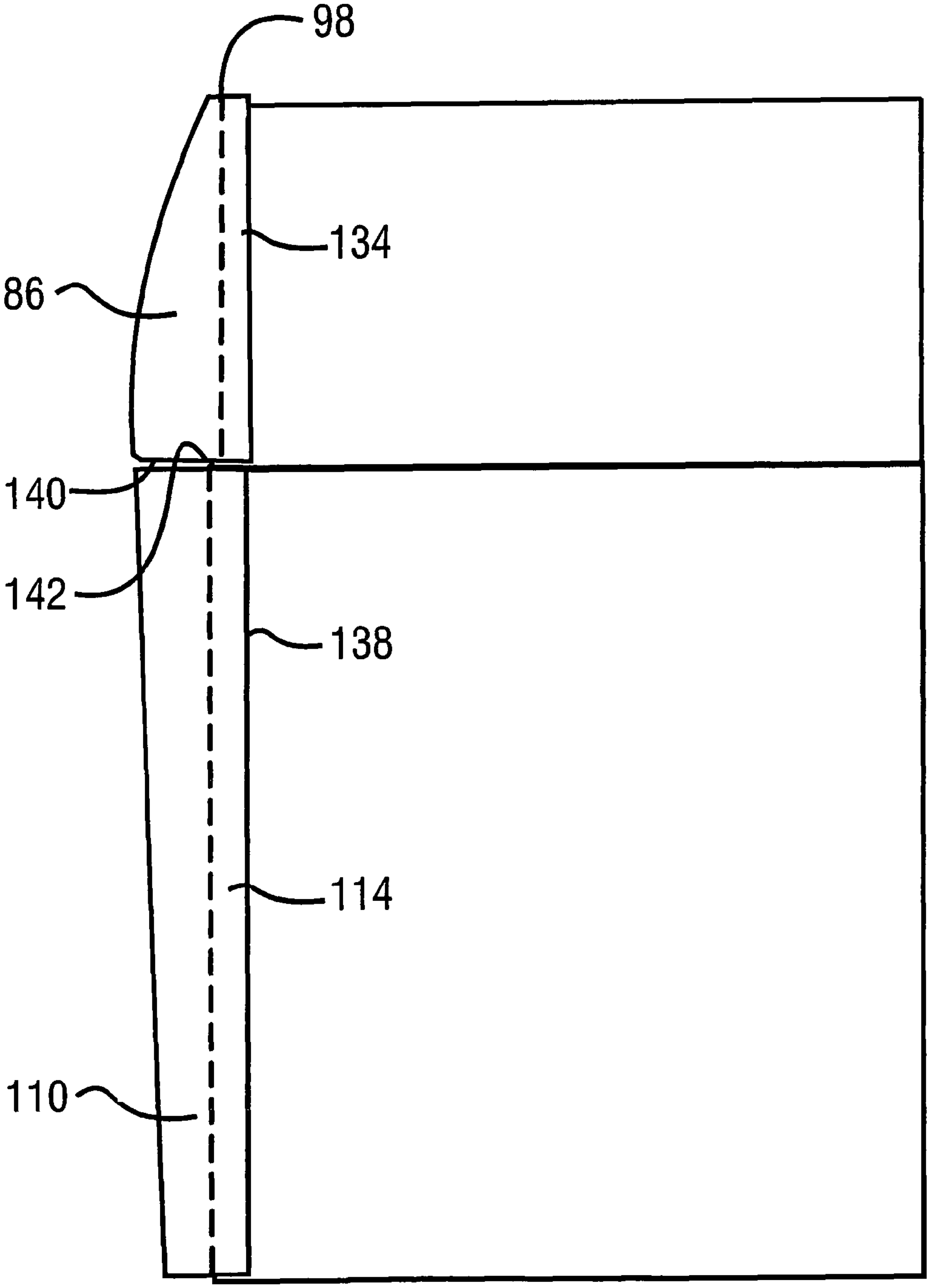
FIG. 8 is a side schematic view of an exemplary embodiment of an automated banking machine illustrating the alignment of an upper fascia and a lower fascia.

As best illustrated in FIG. 8, in the exemplary embodiment, the rearwardly extending portion 98 of upper fascia 86 includes a rearward facing end edge 134. Also, in the exemplary embodiment, first side extension 114 of lower fascia 110 includes rearward facing end edge 138. When viewed from the first side of ATM 10, in the exemplary embodiment, end edge 134 of upper fascia 86 and end edge 138 of lower fascia 110 are substantially vertically aligned along a first side of ATM 10 when the upper fascia 86 is in the first position and the lower fascia 110 is in the covering position.

With continued reference to FIG. 8, in the exemplary embodiment, upper fascia 86 is bounded by a lower surface 140. Lower fascia 110 is bounded by an upper surface 142. In the exemplary embodiment, lower surface 140 is adapted for substantial parallel horizontal alignment with upper surface 142 when the upper fascia 86 is in the first position and the lower fascia 110 is in the covering position. The alignment of the fascia surfaces presents an attractive appearance to ATM 10.

In this exemplary embodiment, the rearwardly extending portion 98 further operates to simplify the manufacture and assembly of the ATM 10. In some previous machines, it was necessary to more precisely control the alignment of the walls of the upper fascia 86 with the perimeter of the front opening. However, in this disclosed exemplary embodiment, because the rearwardly extending portion 98 overlies the forward region 94, the required precision is lessened. Further, in those embodiments which include a tapered engagement, alignment of the top housing 12 and upper fascia 86 is facilitated.

With particular reference to FIG. 5, lower fascia 110 may include an access opening 118 therein. In this exemplary embodiment, access opening 118 in the lower fascia 110 is adapted to be substantially aligned with first device opening 56 in chest door 50 when chest door is closed and lower fascia 110 is in the covering position. In this exemplary embodiment, when the chest door 50 is closed and lower fascia 110 is in the covering position, at least an end portion of sheet delivery mechanism 74 extends in the first device opening 56 in chest door 50 and access opening 118 in lower fascia 110.

As illustrated in FIGS. 1-2, in this exemplary embodiment, ATM 10 includes a first locking mechanism 146 for selectively retaining the rollout tray 80 in the retracted position when upper fascia 86 covers the front opening 22. The first locking mechanism may be of the type described in U.S. Pat. No. 6,082,616 previously incorporated herein.

In the exemplary embodiment, ATM 10 also includes a second locking mechanism 148 for selectively securing lower fascia 110 in the covering position.

Figure 9:
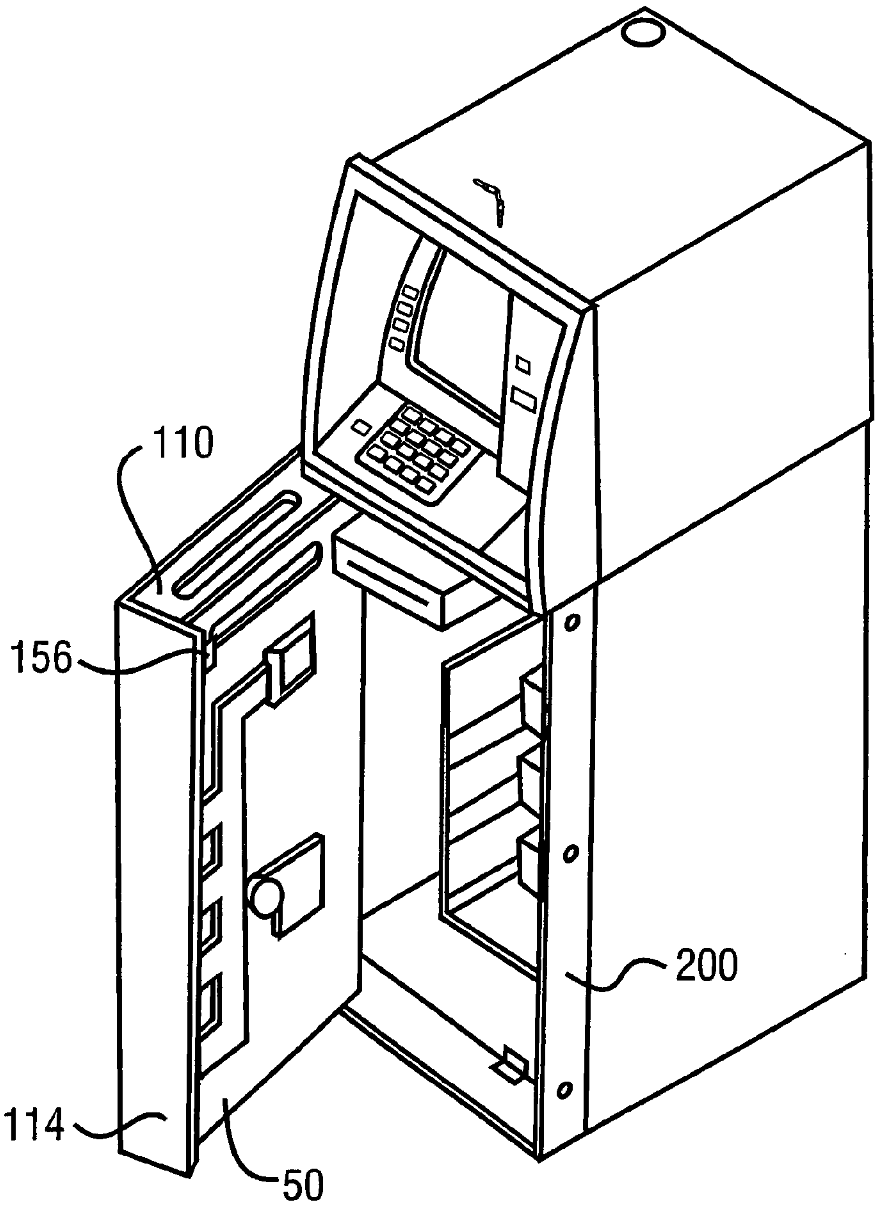
FIG. 9 is an isometric view of an automated banking machine similar to FIG. 5 showing the chest door selectively engaged with the lower fascia.

With particular reference to FIGS. 4, 5 and 9, in another exemplary embodiment ATM 10 may include a top housing 12 as previously described. ATM 10 further includes chest 40 having chest door 50 mounted to the housing 44 by one or more chest door hinge assemblies 152. Lower fascia 110 is movably mounted to chest housing 44 by one or more fascia hinges 154. In this exemplary embodiment, fascia hinge 154 and chest door hinge assembly 152 are situated on the same side of the chest housing 44 so that lower fascia 110 and chest door 50 pivot generally in the same direction relative to the chest.

From time to time, the banking machine components enclosed within secure enclosure 42 must be accessed for replenishment or other servicing activity. Thus, lower fascia 110 may be selectively moved from a covering position into an accessible position to allow access to chest door 50. Chest door 50 may then be selectively opened.

In this exemplary embodiment, as best seen in FIG. 9, lower fascia 110 is operable to engage the open chest door 50 to prevent its movement back to a closed position. In this exemplary embodiment, lower fascia 110 includes an inwardly directed flange 156 carried on an inner surface at a side opposite the fascia hinge 154. Inwardly directed flange 156 is dimensioned to engage at least a portion of chest door 50 when the lower fascia 110 is in the accessible position and the chest door 50 is in the open position. In the exemplary embodiment, lower fascia 110 is adapted to pivot away from the chest door 50 to at least an extent where the chest door may be disengaged from inwardly directed flange 156.

An exemplary embodiment includes a method for accessing the contents of the secure area for servicing components housed therein or to replenish currency sheets. The method includes placing the lower fascia into an accessible position from a covering position to uncover the chest door; opening the chest door to provide access to the secure area through an opening in the chest housing; and engaging the chest door and the lower fascia to hold the chest door in an open condition. Thus a currency dispenser mechanism or other components may be accessed.

Servicing the currency dispenser includes adding or removing currency sheets from operative engagement with the currency dispenser mechanism.

The method further includes engaging the chest door with an inwardly directed flange that is mounted in supporting connection with the lower fascia.

To return the ATM to an operational condition, the method includes moving the lower fascia outwardly relative to the engaged chest door to disengage the chest door; closing the chest door; and repositioning the lower fascia into the covering position.

Repositioning the lower fascia into the covering position includes overlying a first forward portion of the chest housing with a first side extension of the lower fascia and overlying a second forward portion of the chest housing with a second side extension of the lower fascia.

Prior to placing the lower fascia into the accessible position, the method includes unlocking a first locking mechanism operable to selectively retain the lower fascia in a covering position.

Figure 10:
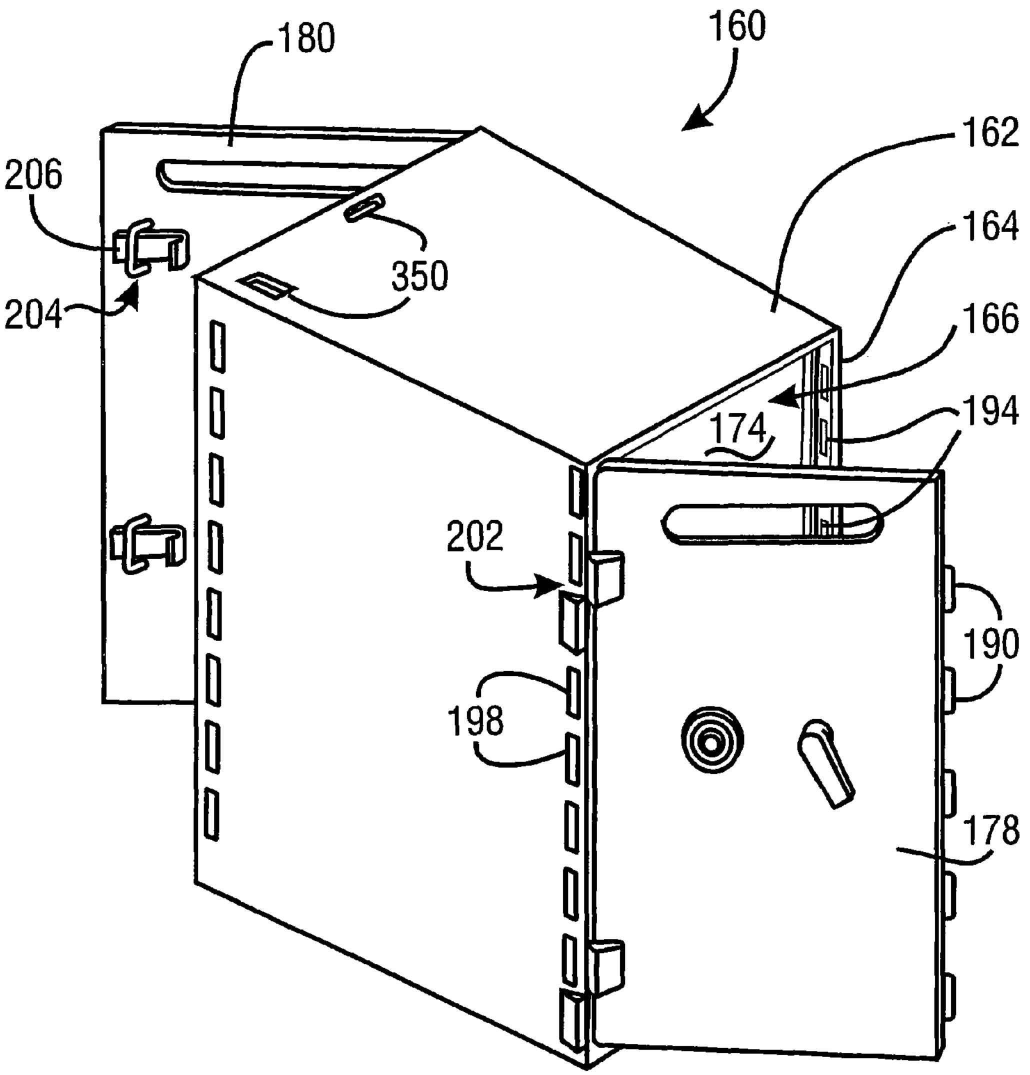
FIG. 10 is a schematic view of an alternate embodiment of a chest for an automated banking machine, as viewed from the front.
Figure 11:
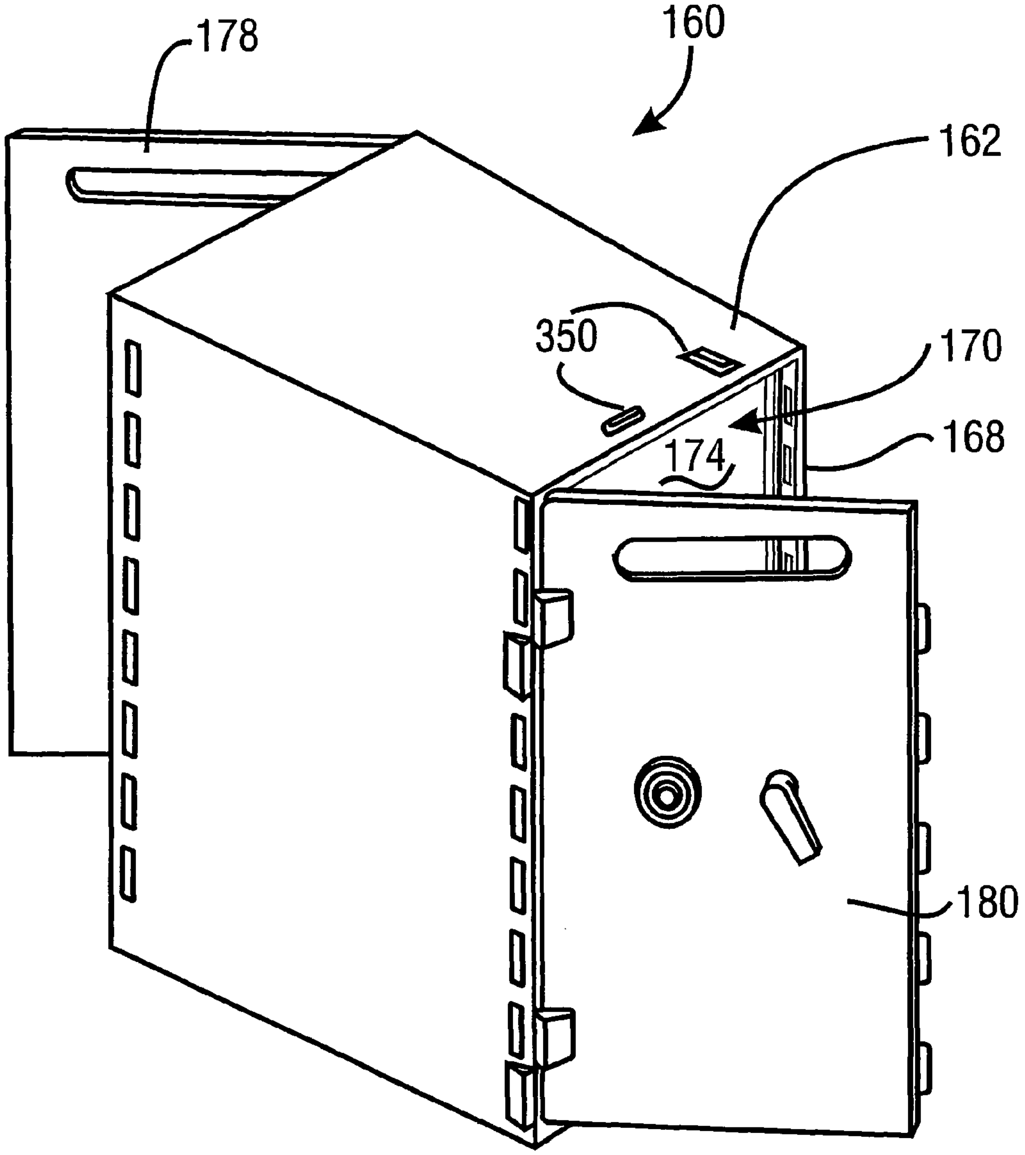
FIG. 11 is a schematic view of the alternate embodiment of the chest shown in FIG. 10, as viewed from the rear.

Some ATMs may be equipped with another exemplary embodiment of a chest or safe 160, as best seen in FIGS. 10-11. Chest 160 includes a chest housing 162 having first end 164 defining a first opening 166 therein and second end 168 defining a second opening 170 therein. The chest of this exemplary embodiment is particularly adapted for applications wherein a common chest housing can be utilized in either "front-load" ATMs or "rear-load" ATMs. By "front-load" ATM it is meant that access to a secure area 174 in an operable machine may be selectively attained from the front of the ATM, which is the same side that customers use to provide input to the machine. By "rear-load" ATM it is meant that access to the secure area 174 in an operable machine may be selectively attained from the rear of the ATM, while customer inputs are provided at the front of the ATM.

In this exemplary embodiment, chest 160 includes a first chest door 178 movably mounted adjacent a first end 164 of chest housing 162 to selectively close the first opening 166. Chest 160 further includes a second chest door 180 movably mounted adjacent the second end 168 to selectively close the second opening 170.

In the exemplary embodiment illustrated in FIG. 10, chest 160 is adapted for use in a front load ATM wherein under usual operating conditions, first chest door 178 is selectively movable to open or close first opening 166 to allow access to secure area 174. In this exemplary embodiment, second chest door 180 is adapted to remain closed during usual operation of the ATM, including those times when access to secure area 174 is desired. For purposes of this disclosure, the term "semi-permanently" closed is used to describe a condition of a chest door that closes an opening in the chest housing in a manner that does not readily permit access to the secure area. In this way, a "semi-permanently" closed chest door is not used as the primary means for accessing the chest interior. However, under appropriate conditions the semi-permanently closed chest door can be opened.

In this exemplary embodiment, first chest door 178 is the operable door and second chest door 180 is adapted to be semi-permanently closed. In other embodiments, for instance in rear-load ATMs, it may be desirable to utilize chest 160 as illustrated in FIG. 11 where the second chest door 180 is the operable door while first chest door 178 is adapted to be semi-permanently closed.

Figure 12:
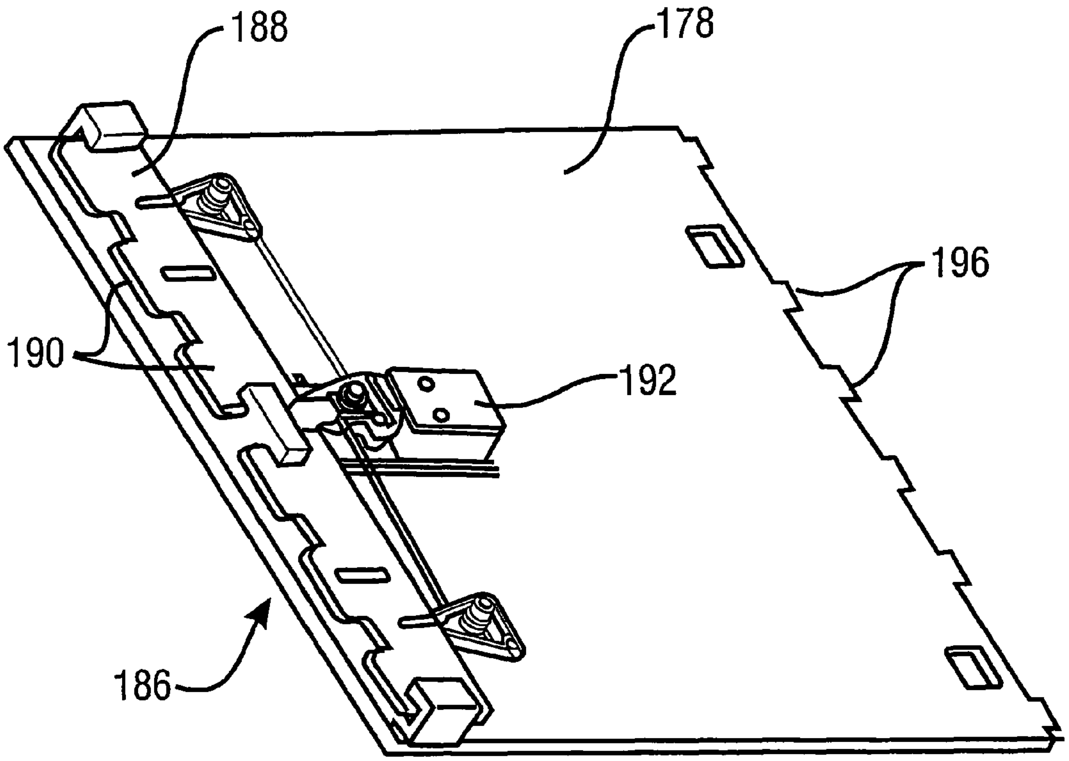
FIG. 12 is an isometric view of a chest door illustrating a locking bolt mechanism.

With particular reference to FIGS. 10 and 12, in the exemplary embodiment, the first chest door 178 is equipped with a suitable locking bolt mechanism generally denoted 186. Locking bolt mechanism 186 is operative to selectively enable securing first chest door 178 in a locked condition. Locking bolt mechanism 186 may be of the type described in U.S. Pat. No. 6,089,168 which is incorporated by reference as if fully rewritten herein. Of course, other suitable bolt works can be utilized to accomplish the objectives.

Locking bolt mechanism 186 of the exemplary embodiment includes a locking bolt 188 which includes a plurality of locking bolt projections 190. Locking bolt 188 is mounted to an interior surface of first chest door 178 so as to be slideably movable between an extended position and a retracted position.

First chest door 178 also has a lock 192 mounted thereto. Lock 192 cooperates with locking bolt mechanism 186 so that first chest door 178 is enabled to be changed from a locked condition to an unlocked condition. As shown in FIG. 10, the chest housing 162 includes a plurality of vertically spaced locking bolt apertures 194 which are sized and positioned for accepting the locking bolt projections 190. The locking bolt mechanism provides multiple places for engagement with the chest housing and achieves secure locking of the door in the closed position.

In the exemplary embodiment, first chest door 178 includes a plurality of dead bolt projections 196 extending on a hinge side of the door. These dead bolt projections 196 are preferably positioned and sized to be accepted in the dead bolt apertures 198 in housing 162. As will be appreciated, the acceptance of the dead bolt projections 196 into the dead bolt apertures 198 provides enhanced security. In an exemplary embodiment, the dead bolt apertures and the locking bolt apertures are covered by trim pieces 200 (shown in FIG. 9) that extend on the outside of the housing.

With reference to FIG. 10, in the exemplary embodiment, the first chest door 178 is operably connected to the chest housing via one or more first chest hinge assemblies 202. The exemplary chest hinge assembly 202 may be of the type described in U.S. Pat. No. 6,089,168, previously incorporated. It will be readily understood that other hinge constructions may be used in other embodiments.

In the exemplary embodiment, the second chest door 180 may be secured in a closed position by a securing mechanism that generally mirrors the locking bolt mechanism 186 and lock 192. Alternately, as illustrated in FIG. 10, second chest door 180 may be "semi-permanently" secured by an alternate securing mechanism 204. The alternate securing mechanism 204 may include a bolt member 206 or other mechanism that is less complex than the locking bolt mechanism and lock previously described. In this exemplary embodiment, routine access to the secure area 174 via second chest door 180 is not necessary during normal operation of the ATM. Thus, the alternate securing mechanism 204 is operable to "semi-permanently" engage the chest door 180. This may be done, for example, by securing the bolt with fasteners or other devices that are only accessible from within the interior of the chest portion. Of course, in some alternative embodiments both chest doors may be equipped with operational locking bolt mechanisms and locks.

The manufacture of an exemplary ATM is simplified by use of chest 160. A common chest housing may be utilized in applications requiring a front-load ATM or a rear-load ATM. After the housing has been assembled, the positioning of a locking bolt mechanism may be chosen according to the configuration of the chest. Additionally, at a subsequent time, the operational features may be changed so that the initial operational chest door becomes the non-operational door and vice versa. Thus, the manufacturing process is simplified by the versatility of the chest housing.

Of course it will be readily appreciated that ATMs incorporating this exemplary embodiment of chest 160 may include any of the other novel features described elsewhere.

An exemplary embodiment includes a method for utilizing an ATM that is equipped with a chest having two opposed openings. The chest housing includes a first opening at a first end thereof and a second opening at a second opposed end. The first door is movably mounted in supporting connection with the chest housing so that the first chest door is operative to selectively close the first opening. A second chest door is movably mounted in supporting connection with the chest housing so that the second door is operative to semi-permanently close the second opening. At least one lower banking machine component is mounted in supporting connection with the chest housing in the secure area.

In the exemplary method, a first locking bolt mechanism in supporting connection with the first chest door is operated to selectively securely engage the first chest door with the chest housing. A first securing mechanism in supporting connection with the second chest door is operated to semi-permanently securely engage the second chest door with the chest housing.

The method includes accessing at least one lower banking machine component of an ATM through a first opening in a chest housing bounding a secure area; and preventing access to the at least one lower banking machine component through the second opening.

The method further includes replacing the first locking bolt mechanism with a second securing mechanism in supporting connection with the first chest door, wherein the second securing mechanism is operative to semi-permanently securely engage the first chest door with the chest housing; and replacing the first securing mechanism with a second locking bolt mechanism in supporting connection with the second chest door, wherein the second locking bolt mechanism is operative to selectively securely engage the second chest door with the chest housing. Thus, the door chosen as the operative door can be selected and changed.

The ATM may include a lower fascia that is mounted in supporting connection with the chest housing, wherein the lower fascia is selectively movable between a covering position and an accessible position. The exemplary method may include moving the lower fascia from the covering position to the accessible position prior to accessing the lower banking machine component. Further, the method may include engaging the first chest door with the lower fascia to hold the first door in the open condition.

The at least one lower banking machine component may comprise a currency dispenser mechanism. The exemplary method includes servicing the currency dispenser mechanism after the at least one lower banking machine component is accessed.

The at least one lower banking machine component may comprise a currency stacker. The exemplary method includes servicing the currency stacker.

Figure 13:
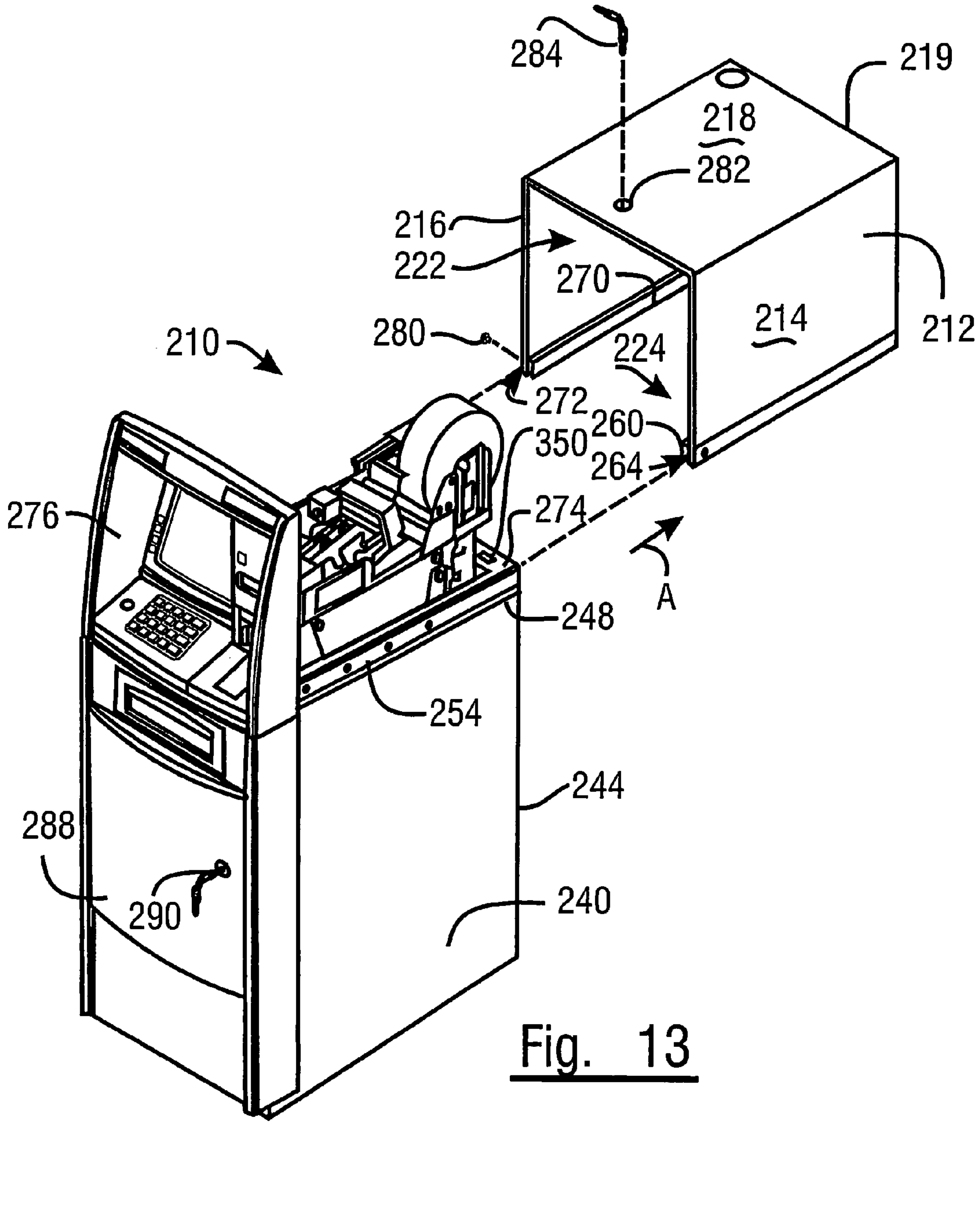
FIG. 13 is an isometric exploded view of an alternate embodiment of an automated banking machine.
Figure 14:
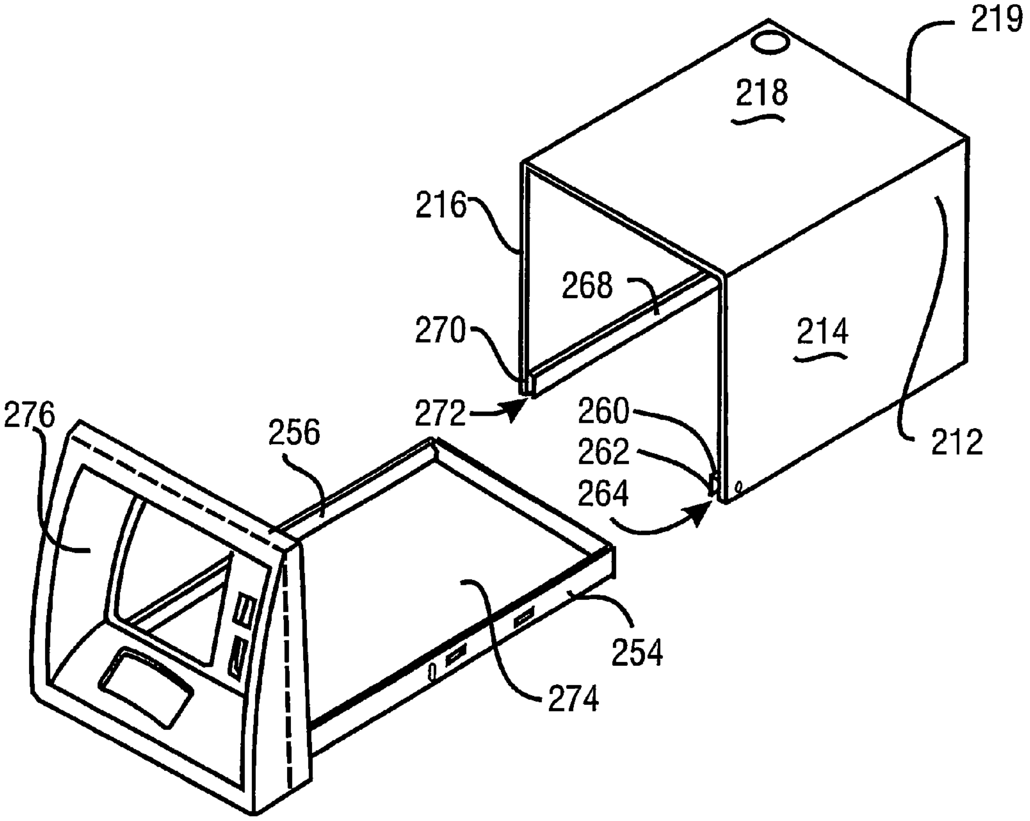
FIG. 14 is an isometric view of a top housing cover, a mounting tray and an upper fascia of an automated banking machine.
Figure 15:
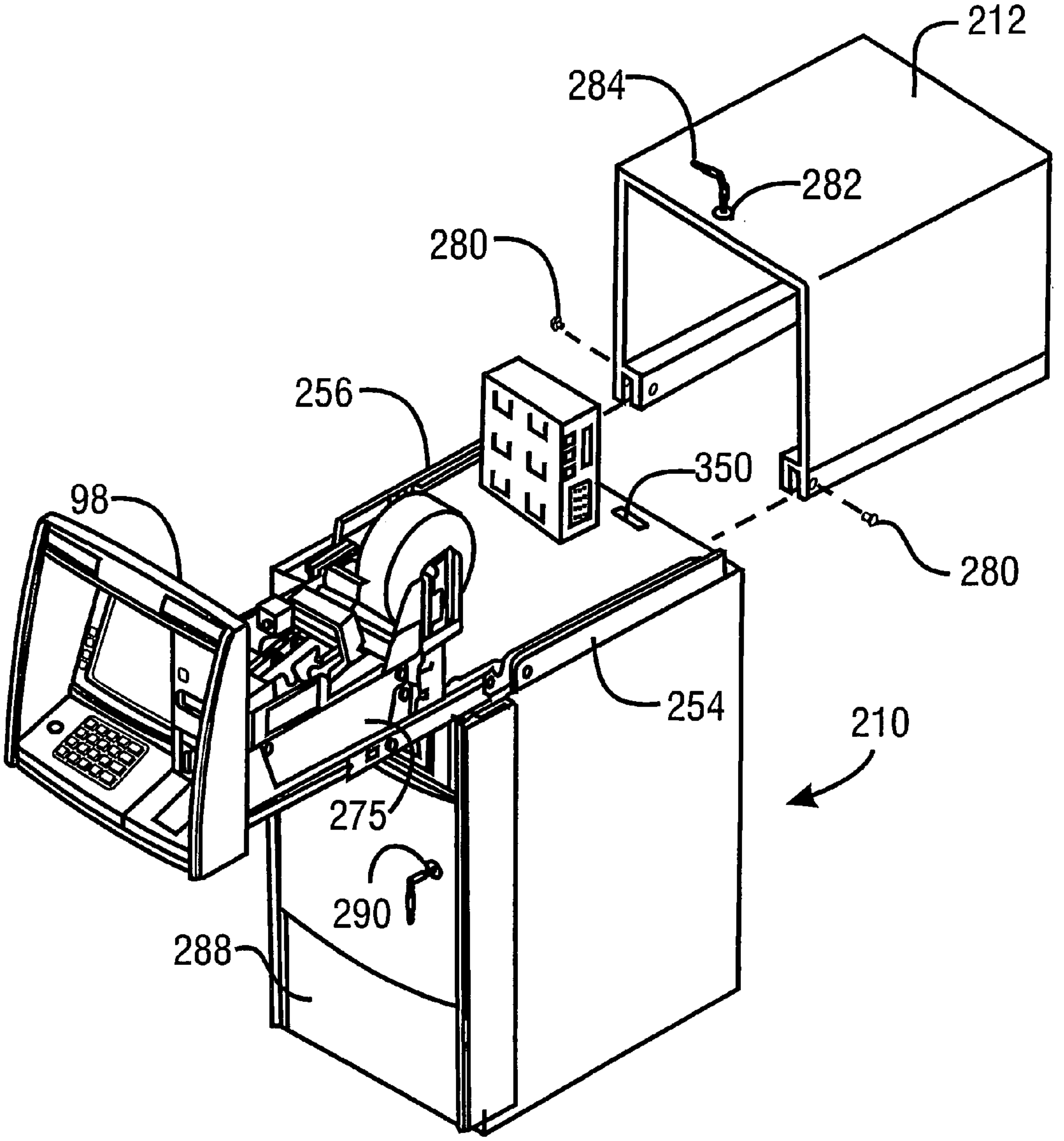
FIG. 15 is an isometric view of an alternate embodiment of an automated banking machine.

Yet another exemplary embodiment of an ATM 210 is illustrated in FIGS. 13-15. ATM 210 includes a top housing cover 212 including first and second side walls 214, 216, top wall 218, and rear wall 219. Top housing cover 212 defines a front opening 222 and a bottom opening 224. In a first (operable) position, top housing cover 212 covers an interior area in which various upper banking machine components such as a display, a receipt printer, a card reader, input keys, a controller, communication device, and others may be disposed.

In this exemplary embodiment, ATM 210 further includes a chest 240 bounding a secure area in a manner similar to that previously described. Chest 240 includes a housing 244 having a top wall 248. Top housing cover 212 is adapted for rearward slidable movement relative to top wall 248 to a second position for service.

In this exemplary embodiment, a first upwardly extending flange member 254 is mounted in supporting connection with top wall 248 along a first side thereof. A second upwardly extending flange member 256 (not shown in this view) is mounted in supporting connection with top wall 248 along a second side thereof.

Supported on the first side wall 214 of top housing cover 212 is a first cooperating channel member 260 having a pair of spaced downwardly extending projections 262 defining a first channel 264 therebetween. Likewise, on the second side wall 216 of top housing cover 212 there is supported a second cooperating channel member 268 having a pair of spaced downwardly extending projections 270 defining a second channel 272 therebetween.

Top housing cover 212 is adapted for slidable movement relative to the top wall 248 by the slidable engagement of the first flange member 254 within first channel 264 and the slidable engagement of the second flange member 256 within second channel 272.

In this exemplary embodiment, ATM 210 includes an upper fascia 276 operable to selectively cover the front opening 222. The top housing cover 212 is adapted for rearward movement relative to the top wall 248 in the direction of arrow A such that rearward displacement of the top housing cover 212 allows access to the upper banking machine components in the interior area, for example, for servicing.

It is contemplated that in exemplary embodiments the positioning of the flange members 254, 256 and the channels 264, 272 be reversed. For example, the top housing cover 212 may support flange members and the mounting tray may support cooperating channel members to accomplish a similar slidable relationship therebetween.

FIG. 14 illustrates an exemplary embodiment wherein the flange members 254, 256 are incorporated into a mounting tray 274 which is operable to receive and support one or more upper banking machine components, which for ease of illustration are not shown in this view. This embodiment allows for ease of assembly of the exemplary ATM 210. The applicable upper banking machine components can be readily mounted onto mounting tray 274, which is mounted in supporting connection with top wall 248 of chest housing 244. Top housing cover 212 may thereafter be positioned by slidable movement of flange members 254, 256 in respective channels 264, 272.

In an alternate embodiment, illustrated in FIG. 15, ATM 210 may include a rollout tray 275 similar to rollout tray 80 as previously described. Flange members 254, 256 may be mounted in supporting connection with rollout tray 275. Thus, upper banking machine components may be accessed by rearwardly sliding the top housing cover 212, extending the rollout tray 275, or a combination of both.

ATM 210 may further include at least one removable fastener 280 for selectively engaging the top housing cover 212 with at least one flange member 254, 256 to prevent relative slidable movement therebetween. In the exemplary embodiment, first and second fasteners 280 are used to secure the top housing cover 212.

ATM 210 may further include a first locking mechanism 282 to secure the top housing cover to upper fascia 276. In this exemplary embodiment, the locking mechanism is operable in response to a key 284. In the exemplary embodiment illustrated in FIG. 15 it is contemplated that fasteners 280 are covered by a rearwardly extending portion of upper fascia similar to portion 98 shown in FIG. 6. Thus, fasteners 280 are not accessible from outside the ATM until first locking mechanism 282 has been operated to release upper fascia 276 so that the upper fascia 276 can be moved away from top housing cover 212.

In the exemplary embodiment, ATM 210 may include a lower fascia 288 with features similar to a lower fascia previously described. Lower fascia 288 may be secured in the covering position by a second locking mechanism 290.

This exemplary embodiment provides ready access to the upper banking machine components, for example, for servicing or replacing. To access the upper banking machine components, fasteners 280 are removed. It is contemplated that in an exemplary embodiment, the fasteners may not be accessible until after the first locking mechanism 282 is unlocked and the upper fascia is displaced slightly to uncover fasteners 280. In other embodiments, the fasteners may be directly accessed.

The top housing cover 212 may then be moved rearwardly, away from upper fascia 276 so that the interior area is accessible. During servicing, the top housing cover 212 may be selectively positioned so that some portion or none of the upwardly extending flanges 254, 256 remain engaged with the channel members 260, 268, respectively.

In one exemplary embodiment, a method is provided for accessing banking machine components of an ATM. The exemplary method includes supporting the top housing cover in a slidable relationship with the top wall of the chest housing, wherein the top housing cover includes a front opening; selectively rearwardly sliding the top housing cover away from a first position in which an upper fascia covers the front opening; and accessing at least one upper banking machine component that is mounted in supporting connection with the top wall of the chest housing.

The exemplary method further includes removing fasteners that may be used to selectively secure the top housing cover in the first position.

The exemplary method further includes operating a locking mechanism to release the top housing cover and the upper fascia.

The exemplary method further includes accessing an upper banking machine component for servicing. The at least one upper banking machine component may be a display that is accessed for servicing.

In one embodiment the ATM includes side flange members mounted in supporting connection with a top wall of a chest housing and cooperative channel members mounted in supporting connection with the top housing cover. In this exemplary embodiment, the method further includes slideably engaging a first flange member with a first channel of a first channel member.

Figure 16:
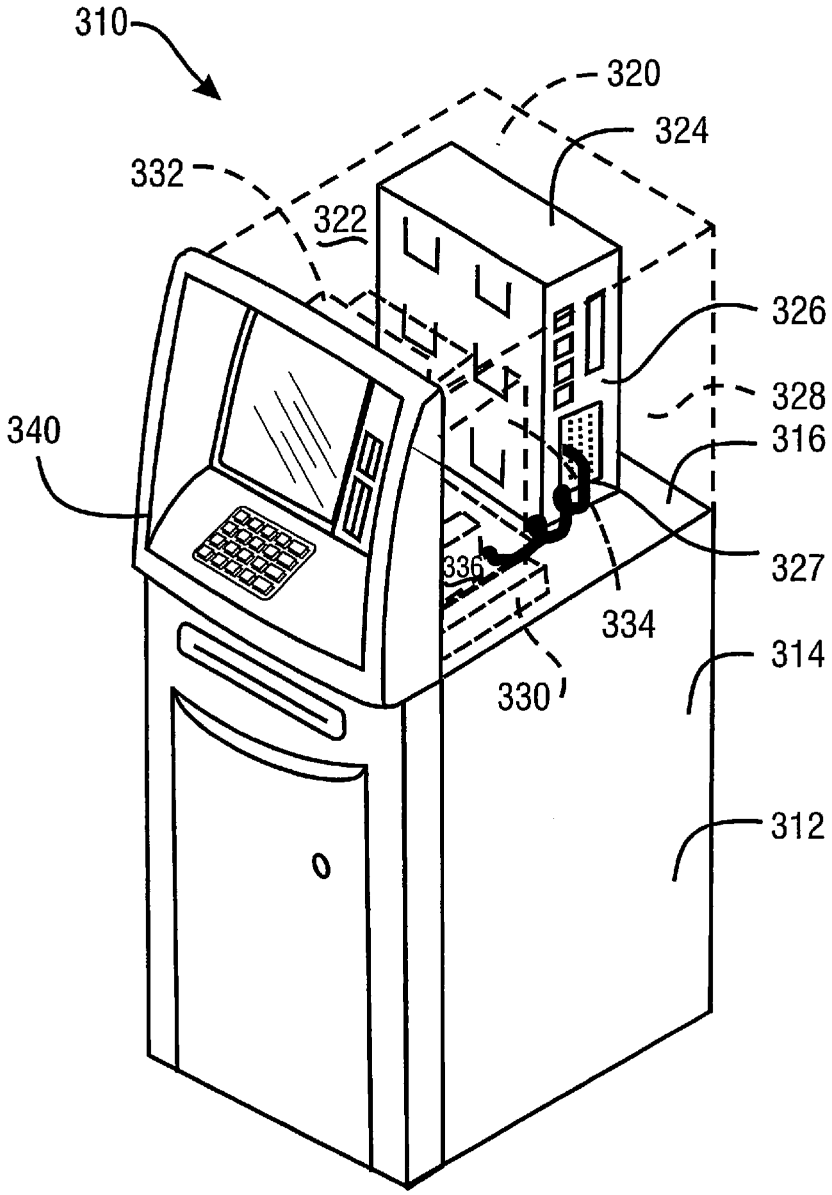
FIG. 16 is an isometric view, partly in phantom, of an alternate exemplary embodiment of an automated banking machine in an operational condition.
Figure 17:
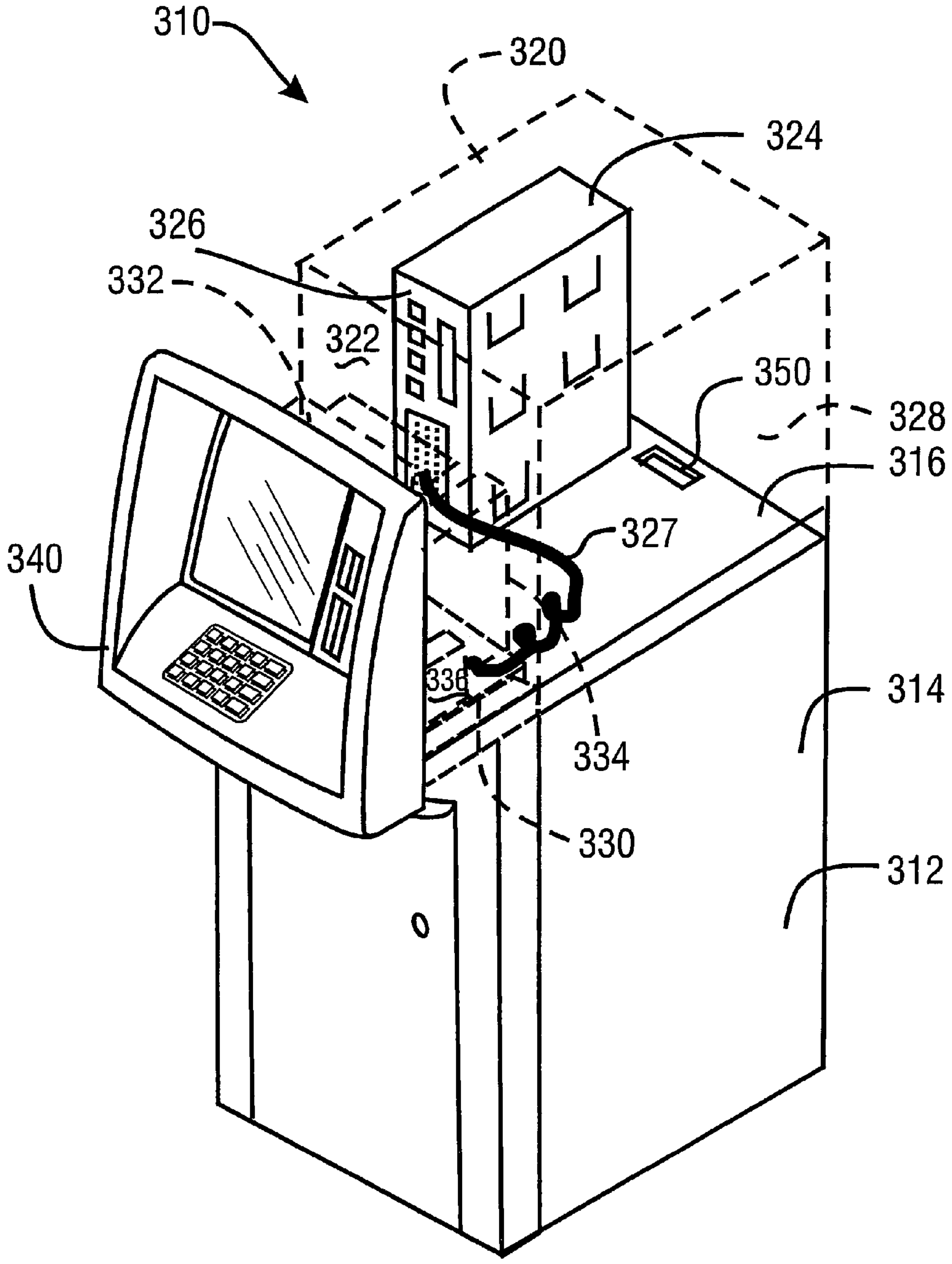
FIG. 17 is an isometric view, partly in phantom, of the automated banking machine of FIG. 16, in a serviceable condition.

In another exemplary embodiment, illustrated in FIGS. 16 and 17, ATM 310 may include a chest 312 having a chest housing 314 including top wall 316. As in previously described embodiments, chest housing 314 bounds a secure area which holds lower banking machine components including a currency dispenser mechanism which may be similar to mechanism 64 shown in FIG. 3. ATM 310 further includes a top housing 320 (shown in phantom) bounding an interior area 322.

In this exemplary embodiment, ATM 310 includes a processor case 324 that houses the primary ATM processor. The processor may be an Intel Pentium (PL type) processor. Of course, in some embodiments the case may house multiple processor or no processors at all. The ATM processor operates the various systems and mechanisms in the ATM.

In this exemplary embodiment, processor case 324 is in supporting connection with top wall 316 of chest housing 314. Processor case 324 includes a first functional side 326 that is operable to establish connections, such as through cable 327, from the various banking machine components. Other processor components, including but not limited to circuit cards having various functions, additional processors, drives (CD, DVD, floppy), power supplies, memory, or encryption cards, may be carried on or within processor case 324. Such components may also be accessed, removed and/or replaced and routine maintenance performed through access to the functional side of the processor case.

In order to minimize the space occupied by ATM 310, it is advantageous to orient processor case 324 of the exemplary embodiment so that the first functional side 326 is substantially parallel to a first side wall 328 (shown in phantom) of top housing 320. However, in order to easily access first functional side 326 for servicing or connecting cables, it is advantageous to orient processor case 324 so that the first functional side 326 is substantially perpendicular to the first side wall 328, facing the front opening of the ATM. In order to accomplish both these purposes, the processor case 324 of the exemplary embodiment is rotationally supported in connection with the top wall 316 of the chest housing. The processor case 324 is selectively rotationally movable between an operational position, shown in FIG. 17, wherein the first functional side 326 is substantially parallel to the first side wall 328, and a service position, shown in FIG. 16, wherein the first functional side 326 is substantially perpendicular to the first side wall 328.

In this exemplary embodiment, a rollout tray 330 is supported on the top wall 316 of the chest housing 314. As in earlier described exemplary embodiments, the rollout tray 330 is selectively movable between a retracted position wherein the rollout tray 330 is within the interior area 322, and an extended position wherein the rollout tray 330 extends outwardly from the interior area through a front opening in the top housing 320. In the exemplary embodiment, various upper banking machine components such as display 332, receipt printer 334, and card reader 336 are supported on rollout tray 330. Also, an upper fascia 340 may be mounted in supporting connection with rollout tray 330. As in other described embodiments, when the rollout tray is in the retracted position, the upper fascia 340 covers the front opening in the top housing.

In the exemplary embodiment, when rollout tray 330 is in the retracted position, as illustrated in FIG. 16, the processor case 324 is prevented from rotating from the operational position to the service position. When the rollout tray 330 is in the extended position, as illustrated in FIG. 17, there is enough clearance in the interior area 322 to permit the processor case 324 to be rotated into the service position. Thus, when the rollout tray 330 is in the extended position, the upper banking machine components supported thereon are readily accessible for service. Likewise, the cable connections and any processor components carried on the processor case are accessible for service.

In a method for servicing banking machine components of an ATM, a rollout tray 80 mounted in supporting connection with a top housing 320 is extended from a retracted position so that the rollout tray extends through a front opening in the top housing. The method includes disengaging any locking mechanisms that operate to retain the rollout tray in the retracted position.

A processor case 324 disposed in an interior area bounded by the top housing may be rotated from an operational position to a service position. At least one processor component mounted in supporting connection with the processor case may be accessed for servicing. After servicing of the processor component is complete, the processor case may be rotationally returned to the operational position from the service position. Thereafter, the rollout tray may be repositioned into the retracted position.

The step of servicing the processor component may include connecting or disconnecting cables or connections, adding or replacing components such as circuit cards, performing diagnostic tests and other functions to facilitate operation of the ATM.

Prior to repositioning the rollout tray, other banking machine components may be serviced while the rollout tray is extended. For example, a display, card reader, and receipt printer assembly are readily accessible for service. The service can include routine maintenance, replacement of non-working components, addition of other banking machine components, and the like. Connections with the processor can be readily made while the rollout tray is in the extended position and the processor case is in the service position.

The ATM may include a slidable top housing cover as earlier described. The service method includes the step of rearwardly sliding the top housing cover. After the servicing of banking machine components is completed, the method includes returning the top housing cover to an operational position.

During servicing of the ATM, the lower banking machine components may also be accessed for servicing. The service method includes disengaging any locking mechanisms that retain the lower fascia in a covering position. The lower fascia may thereafter be moved into the accessible position. The locking bolt mechanism that securely engages the chest door with the chest housing may be disengaged so that the chest door may be placed in the open position.

An exemplary method further includes the step of engaging the chest door with the lower fascia when the chest door is in the open position and the lower fascia is in the accessible position in order to retain the door in the open position.

The lower banking machine components, such as currency stacker, currency dispenser mechanism, and currency delivery mechanism (as shown in FIG. 3). An exemplary service method includes performing routine maintenance, replenishing currency, removing sheets, disengaging sheets from the currency dispenser mechanism, replacing components and the like.

The ATM can include connections and/or cables that extend between the processor case and lower banking machine components that are generally housed within the secure chest. The chest housing may include various openings 350 through the walls to accommodate the connections and/or cables (FIGS. 10-11 and 17). When the processor case is in the service position, the connections can be readily established, maintained and/or changed.

An exemplary method of constructing an ATM apparatus is provided. The exemplary method includes mounting a top housing in supporting connection with a chest adapted for use in an automated banking machine apparatus. A first chest door is operable to selectively close a first opening in the chest housing.

The method further includes mounting an upper fascia in supporting connection with the top housing and mounting a lower fascia in movable supporting connection with the chest housing.

The upper fascia and the top housing are selectively positioned relative each other so that a front opening in the top housing is selectively covered by the upper fascia, and wherein a rearwardly extending portion of the upper fascia overlies a forward region of the top housing.

The lower fascia is selectively positioned in a covering position relative a chest door wherein a first side extension of the lower fascia overlies a first forward portion of the chest housing and wherein a second side extension of the lower fascia overlies a second forward portion of the chest housing.

In an exemplary method, a lower edge surface of the upper fascia is placed in substantially parallel alignment with an upper edge surface of the lower fascia and an end edge of a rearwardly extending portion of the upper fascia is substantially vertically aligned with an end edge of a first side extension of the lower fascia at a first side of the ATM.

In an exemplary method, a second chest door is movably mounted in supporting connection with the chest housing to operably close a second opening in the chest housing. A first locking bolt mechanism may be mounted to the first chest door and an alternate securing mechanism may be mounted to the second chest door.

In an exemplary method, a processor case is mounted in supporting rotational connection with a top wall of the chest housing wherein the processor case is selectively movable between an operational position and a service position, and wherein the processor case houses at least one processor.

In an exemplary method, at least one upper banking machine component is mounted in supporting connection with a rollout tray which is mounted in movable supporting connection with the chest housing, wherein the rollout tray is selectively movable between a retracted position wherein the rollout tray is within an interior area, and an extended position wherein the rollout tray extends outwardly from the interior area through the front opening in the top housing.

The exemplary method includes selectively placing the rollout tray in the extended position, selectively rotating the processor case into the service position, and establishing an operable connection between the at least one upper banking machine component and the at least one processor.

In an exemplary method, the lower fascia is equipped with an inwardly extending flange operative to selectively engage the chest door when the lower fascia is in the accessible position and the chest door is in the open position.

Figure 18:
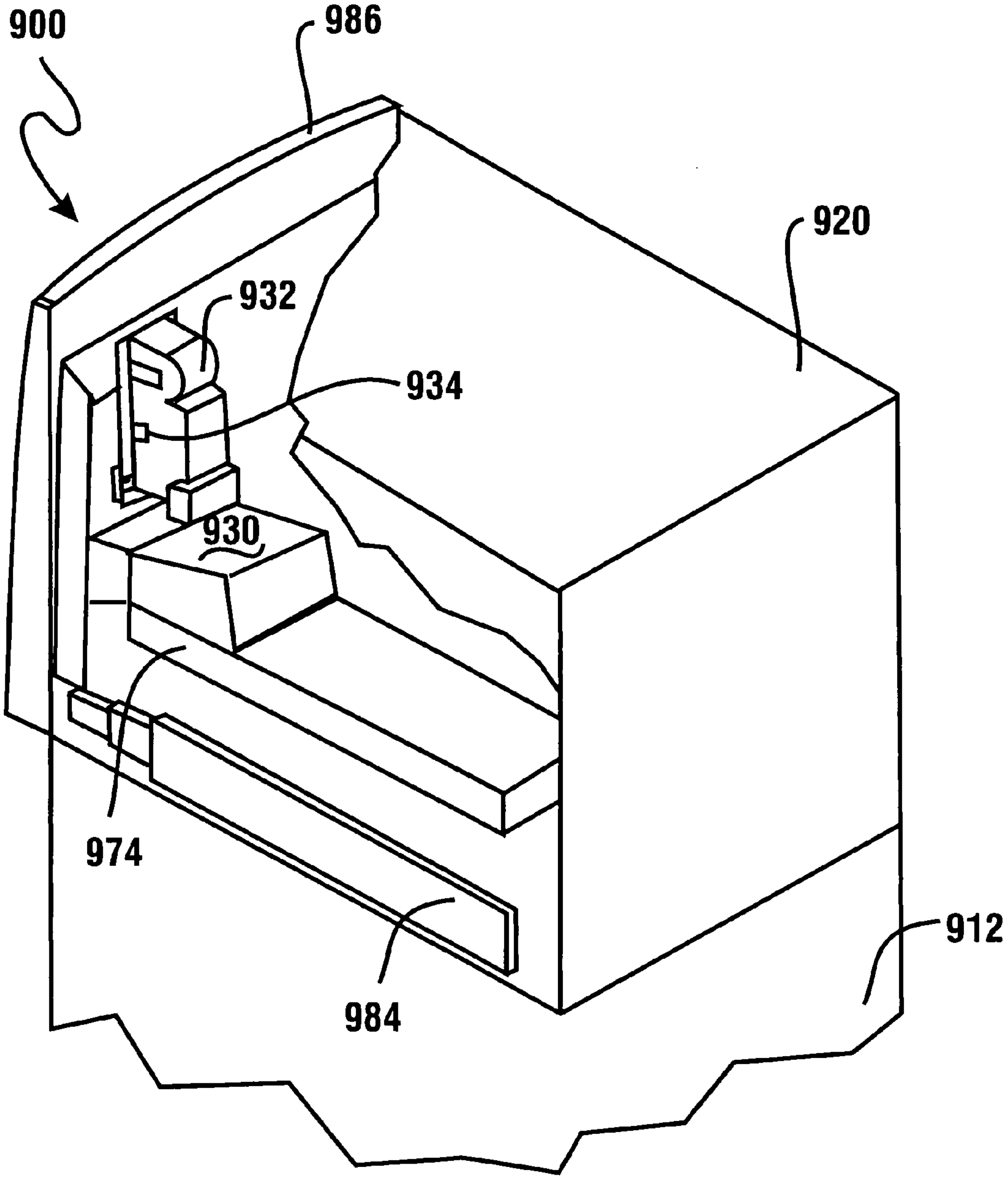
FIG. 18 is an isometric view, partially cutaway, of an exemplary embodiment of an automated banking machine illustrating a journal printer.
Figure 19:
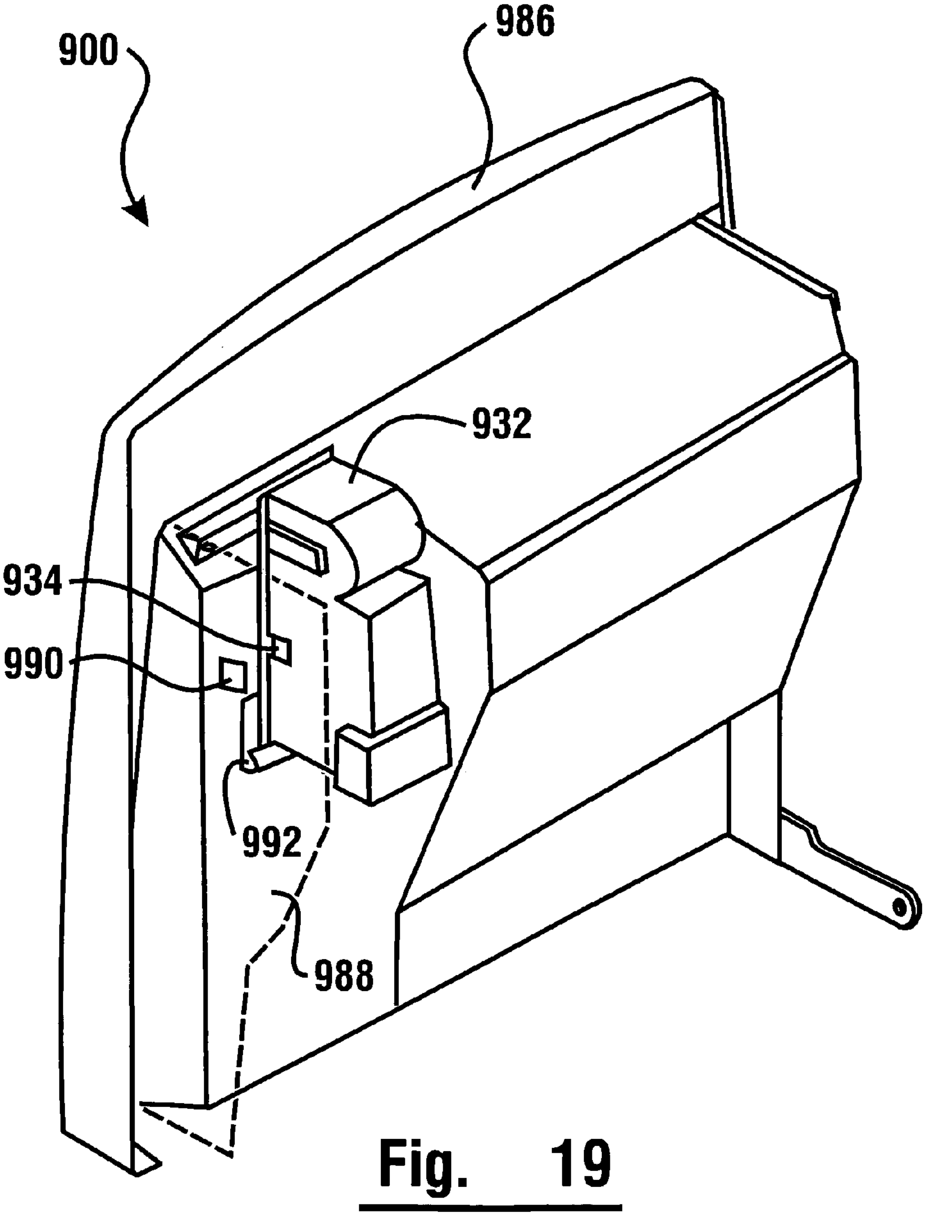
FIG. 19 is a partial isometric view, partly in phantom, of the exemplary embodiment of FIG. 18.

In a further exemplary embodiment, illustrated in FIGS. 18 and 19 (with further exemplary reference to FIGS. 2 and 3), an ATM 900 includes a housing 920, generally mounted on a chest 912. Further included are a card reader (e.g., 24, FIG. 3), operative to read indicia on user cards corresponding to financial accounts, in operatively-supported connection with the housing 920, a display (e.g., 28, FIG. 3) in operatively-supported connection with the housing 920, and a cash dispenser 974 (FIG. 18) in operatively-supported connection with the housing 920. A fascia 986 is movably mounted in operatively-supported connection with the housing 920 and the fascia 986 is movable between a closed position adjacent the housing 920 and an away position wherein the fascia 986 is at least partially disposed from and separated from the housing 920. The fascia 986 may be supported by the housing 920 through two horizontally-disposed members (e.g., 484, FIG. 18) which may be bayonet slides. The display (e.g., 28, FIG. 3) is viewable through an opening (not shown) in the fascia 986 (see also, e.g., FIG. 2). A receipt printer 930 is mounted in operatively-supported connection with the fascia 986.

As shown particularly in FIGS. 18-21, a journal printer assembly 932 is mounted in operatively-supported connection with the fascia 986 and includes, in combination, a print head 936, operative to print indicia representative of automated banking machine 900 status data, automated banking machine 900 financial transaction data, or combinations thereof. The printer includes a paper supply 938, and a paper take-up 940. The journal printer assembly 932 may be mounted vertically and the paper take-up 940 and the paper supply 938 may be in an above-and-below relation with the print head 936. The journal printer assembly 932 may also be mounted above the receipt printer 930.

The print head 936 may comprise a thermal print head and the paper supply 938 comprise paper thermally actuatable, for example, but not limited to, thermochromic paper. Alternatively, the print head may be an inkjet or impact type. The paper supply 938 may further comprise a tensioner 942 adapted to urge the paper supply 938 toward a rolled-up direction. Similarly, the paper take-up 940 may further comprise a tensioner 944 adapted to urge the paper take-up toward a rolled-up direction. The tensioners may include suitable springs, drives or other items that apply a biasing force to the paper or roll supports. As will be appreciated by those skilled in the art, the paper supply 938 may comprise, for example, flat rolled or accordion-folded paper.

Figure 20:
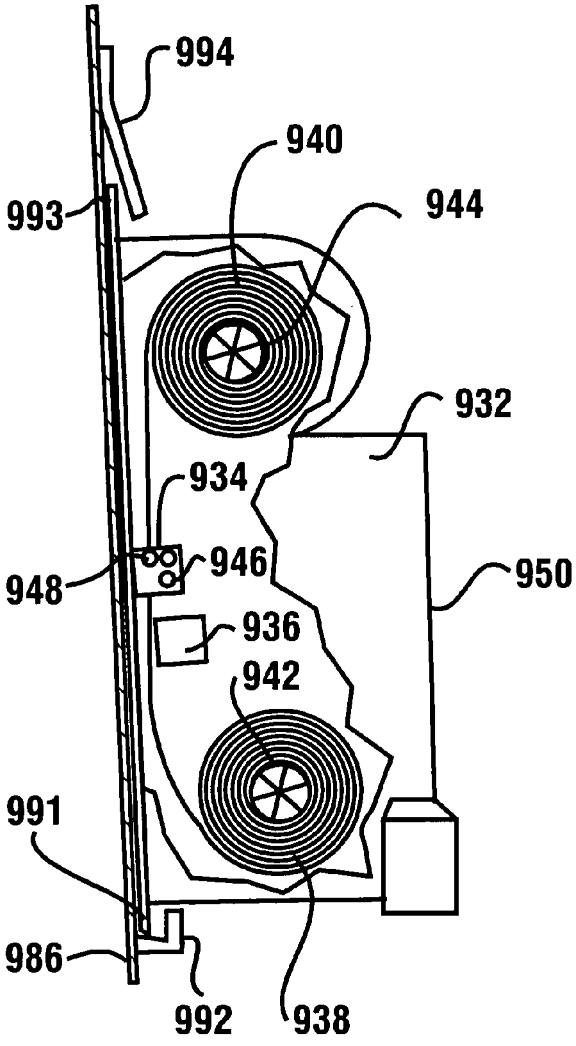
FIG. 20 is a side elevation view, partially cutaway, of an exemplary embodiment of a journal printer illustrating an exemplary mount.
Figure 21:
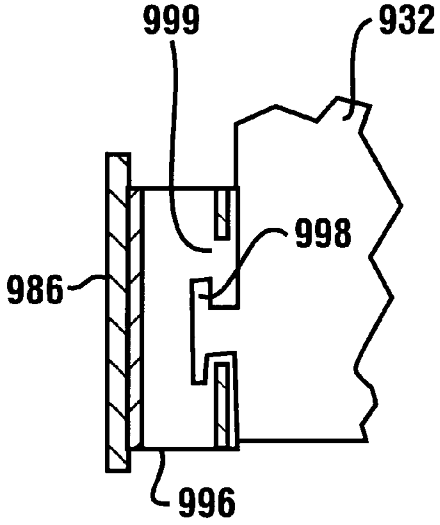
FIG. 21 is a partial side elevation section view of an exemplary embodiment of a journal printer illustrating an exemplary mount.

As shown in FIG. 20, an exemplary embodiment of the journal printer assembly 932 may include a journal printer housing 950 which may be adapted to house or at least partially enclose the print head 936, the paper supply 938, and the paper take-up 940. Optionally, the journal printer housing 950 may be further adapted to house the paper supply tensioner 942 and the paper take-up tensioner 944. As also shown in FIG. 20 (also shown in FIGS. 18 and 19), the journal printer housing 950 may be formed to include an aperture or window 934 positioned to enable access to at least one input device such as buttons 946 or at least one indicator schematically shown as 948. The indicators may comprise LEDs or other suitable output devices that provide visual outputs indicative of conditions such as, but not limited to, out-of-paper conditions, paper jam conditions, paper or a tear condition. The input devices may be actuated to cause functions such as paper advance, or paper run out.

As best seen in FIG. 19, the fascia 986 may further include a fascia panel 988 which may be formed to include a fascia panel aperture 990. As assembled, the fascia panel aperture 990 and the journal printer housing aperture 934 may be positioned relative to one another to enable manual and/or visual access to the at least one input device and at least one indicator.

As also shown in FIG. 20, the fascia 986 may further include a support bracket first portion 992 which comprises, as shown in exemplary fashion in FIG. 20, a channel. The journal printer assembly 982 may further include a support bracket second portion 991 which cooperates with the support bracket first portion 992 to operatively support the journal printer assembly 982 on the fascia 986. The printer may further be in operative connection with a portion 993 that is positionable below a bracket 994. Such engagement holds the printer in engagement with the fascia. Alternatively, and as shown in exemplary fashion in FIG. 21, the exemplary fascia 986 includes a keyhole support bracket first portion 996 comprising a female keyhole 999. The journal printer assembly 932 may further include a key support bracket second portion comprising a male key 998.

An exemplary method of constructing or otherwise associating components of an automated banking machine apparatus is provided. The exemplary method comprises mounting a housing in supporting connection with a chest adapted for use in an automated banking machine, the chest defining a secure area and housing at least a portion of a currency dispenser mechanism, the housing including a card reader in operatively-supported connection with the housing, the card reader operative to read indicia on user cards corresponding to financial accounts, a display in operatively-supported connection with the housing, and a cash dispenser in operatively-supported connection with the housing; mounting a fascia to the housing, the display viewable through an opening in the fascia, the fascia movably mounted in operatively-supported connection with the housing; and mounting a journal printer assembly to the fascia, the journal printer assembly including, in combination, a print head, a paper supply, and a paper take-up mounted in operatively-supported connection with the fascia. Further the fascia may include at least one journal printer assembly support bracket first portion and the journal printer assembly itself may include at least one support bracket second portion and the exemplary method may further comprise engaging the at least one support bracket second portion with the journal printer assembly support bracket first portion.

The exemplary method may further comprise mounting the journal printer in a vertical orientation, with the paper take-up is positioned above the print head and the paper supply is positioned below the print head.

The journal printer assembly may further include a journal printer housing, the journal printer housing formed to include an aperture, the aperture positioned to enable manual and/or visual access to journal printer input device(s) and/or indicator(s) and the fascia including a fascia panel, and the fascia panel formed to include a fascia panel aperture. The exemplary method may further comprise aligning the journal printer housing aperture and the fascia panel aperture, to enable access to journal printer functions.

An exemplary method of servicing an ATM apparatus is provided. The exemplary method comprises moving a fascia away from a housing of an automated banking machine, the automated banking machine including a card reader operative to read indicia on user cards corresponding to financial accounts and a cash dispenser in operatively-supported connection with the housing, and subsequently servicing a journal printer assembly operatively supported on the fascia. The exemplary method may further comprise service steps of, for example, installing a paper supply roll, removing a paper take-up roll, adjusting a printer head, clearing a paper jam, adjusting a paper roll tensioner, inspecting indicia of journal printer assembly operation manually operating an input device, or combinations thereof.

The journal printer assembly may include a journal printer housing, the journal printer housing formed to include an aperture, the aperture positioned to enable visual and/or manual access to journal printer input device(s) and/or indicator(s). The exemplary method may further comprise accessing the journal printer functions through the journal printer housing aperture.

The exemplary fascia includes a fascia panel, the fascia panel formed to include a fascia panel aperture, the aperture positioned to enable access to journal printer functions. The exemplary method may further comprise accessing the input devices and/or viewing the indicators through the journal printer housing aperture. Of course these methods are exemplary.

The exemplary method may further comprise demounting and separating the journal printer assembly from the fascia. The exemplary method may further comprise mounting the journal printer assembly onto the fascia.

Figure 22:
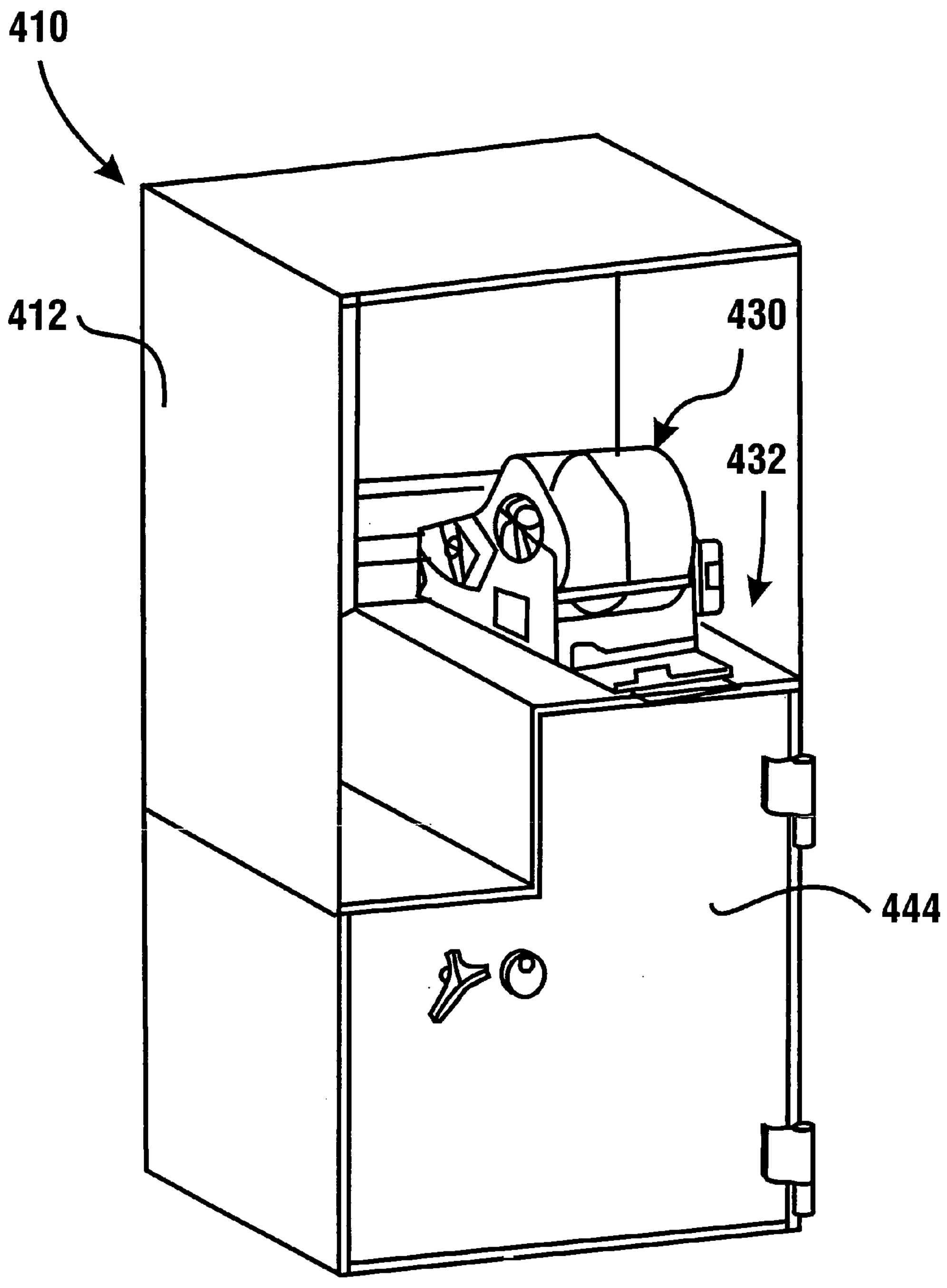
FIG. 22 is an isometric view of an automated banking machine of an exemplary embodiment illustrating a serviceable component in a racked-in position within the top housing.
Figure 23:
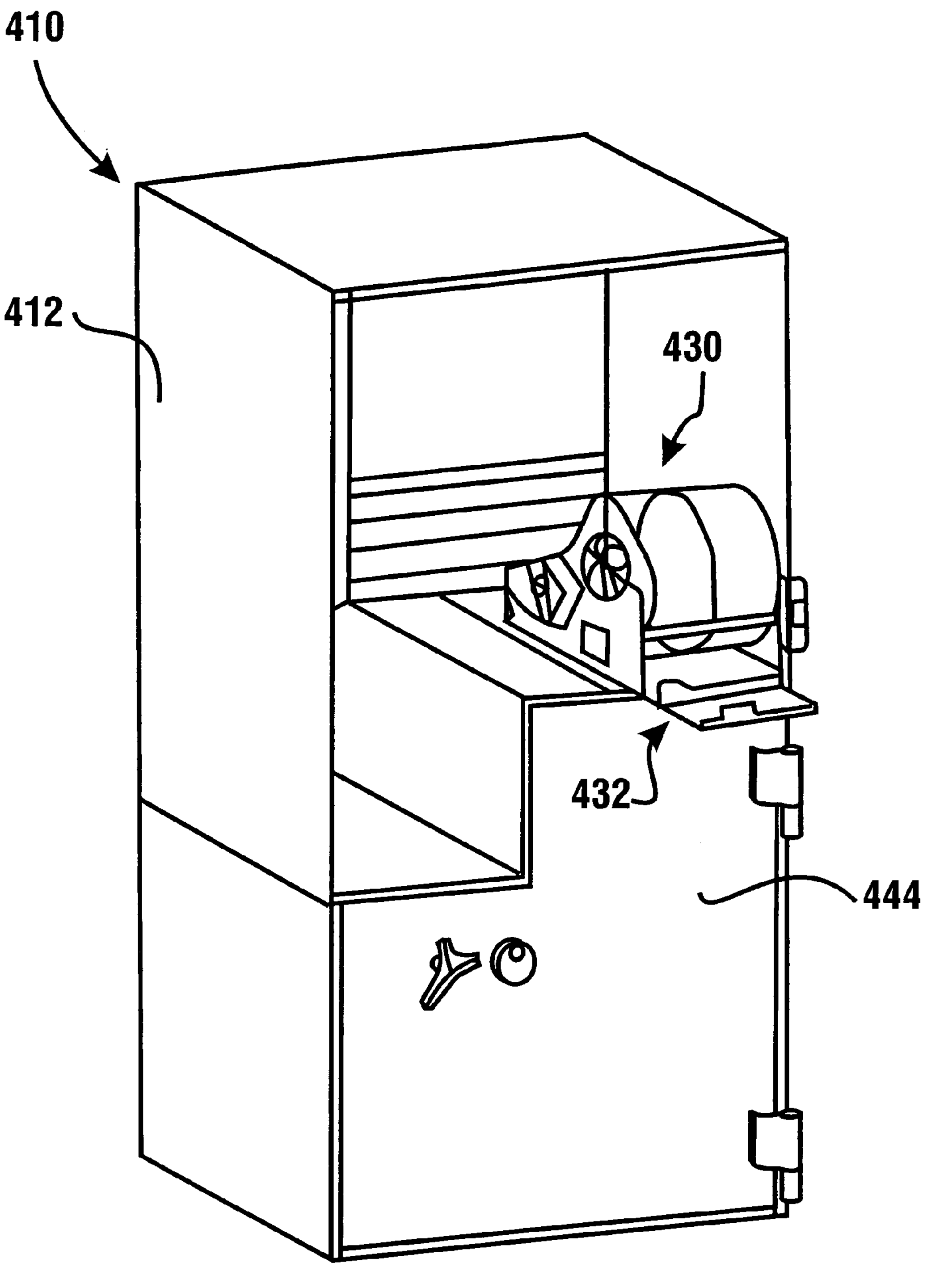
FIG. 23 is an isometric view of the automated banking machine of FIG. 22 illustrating the serviceable component in a racked-out position.

Referring again to the drawings, and particularly to FIGS. 22-25, there is shown therein an automated banking machine of a further exemplary embodiment, generally indicated as 410. In this exemplary embodiment, a top housing 412 is mounted on a chest housing 444. The top housing 412 includes an interior area and at least one opening as shown. Also shown in FIGS. 22 and 23 is a receipt printer 430 mounted on a receipt printer rack 432. In addition to the receipt printer 430, other serviceable components may also be in operatively-supported connection with the top housing 412, including, for example, a card reader (24, FIG. 2), a display (28, FIG. 2), and a cash dispenser (64, FIG. 3). To be accessed for servicing, the receipt printer 430 may be moved on the receipt printer rack 432 from the interior of the top housing 412 to at least partially outside the top housing 412 as shown in FIG. 23.

Figure 24:
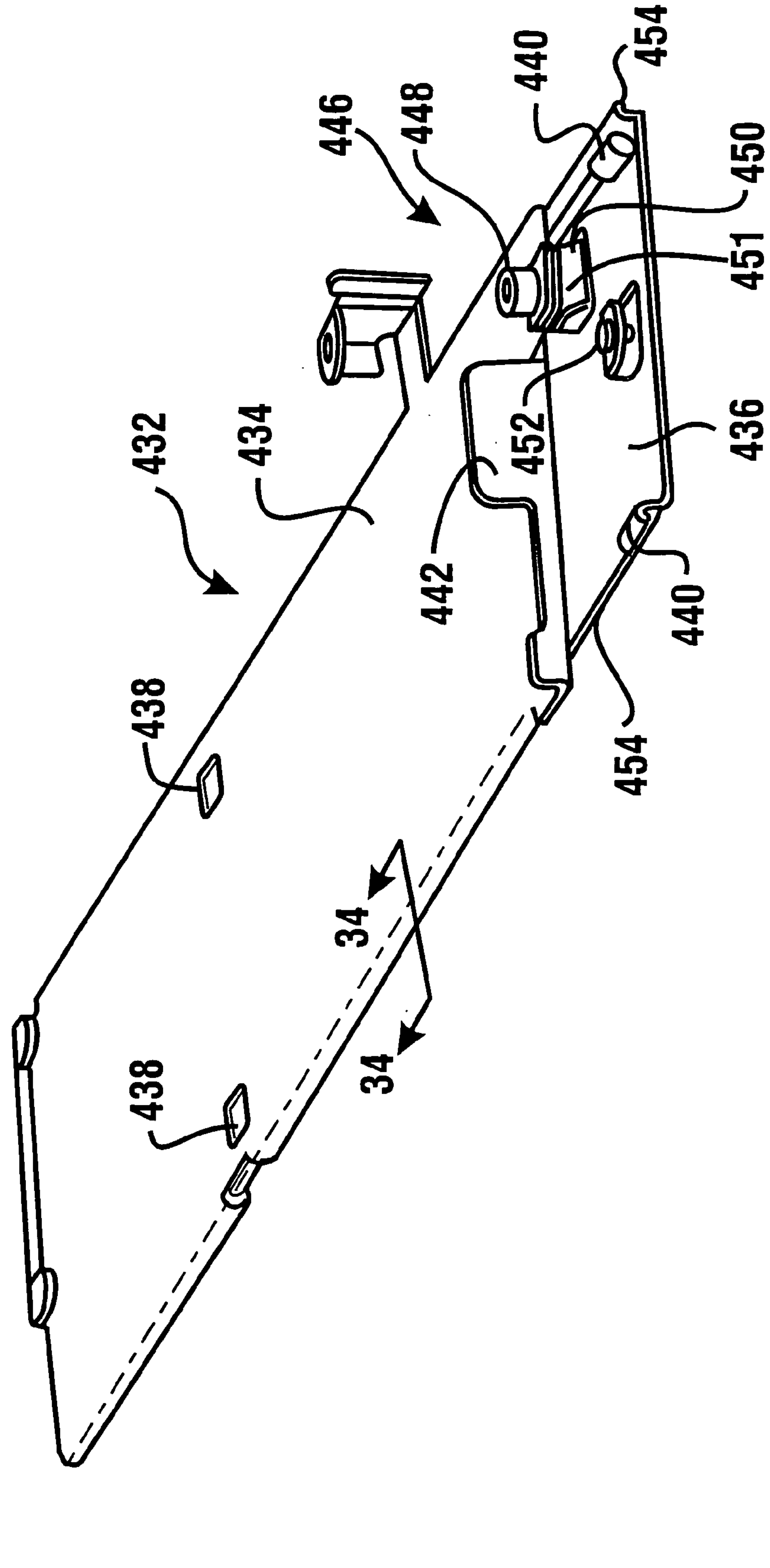
FIG. 24 is an isometric view of the component rack of the automated banking machine of FIG. 22 illustrating the rack in a racked-in position.
Figure 25:
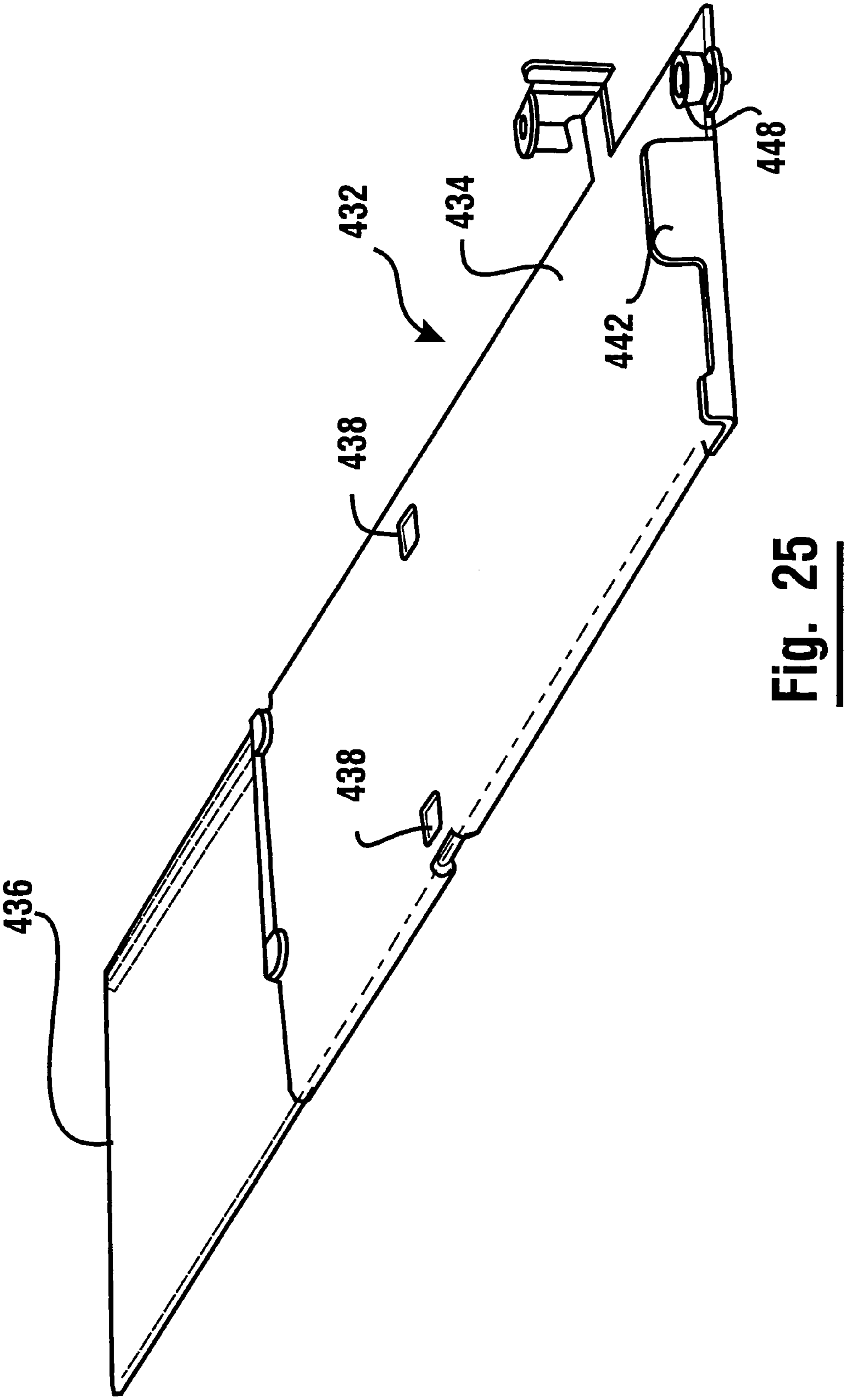
FIG. 25 is an isometric view of the component rack of FIG. 24 illustrating the rack in a racked-out position.
Figure 34:
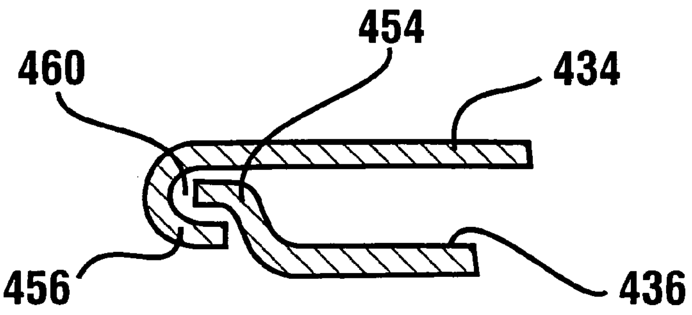
FIG. 34 is a partial section view along the line 34-34 of FIG. 24 illustrating an exemplary track-and-slide configuration of the rack of FIG. 24.

Looking more closely at exemplary component rack 432, FIGS. 24 and 25 show various elements. A fixed member 436 is configured to be secured to the top housing 412 in the interior area. The fixed member 436, as shown in exemplary fashion in FIGS. 24 and 24, includes a parallel pair of rails 454 (shown in detail in FIG. 34) which cooperate with a respective parallel pair of tracks 460 formed by elongated loops 456 (FIG. 34) in a moveable member 434.

To facilitate movement of the moveable member 434 relative to the fixed member 436, and rack the receipt printer 430 to a position for servicing, one or more friction reducers 452 may be included to reduce the drag between the moveable member 434 and the fixed member 436. As shown in exemplary fashion in FIG. 24, the friction reducer 452 may be one or more plastic buttons 452 secured to either the fixed member 436 (as shown in FIG. 24), the moveable member 434, or both. The plastic buttons 452 may be low-friction materials, for example, but not limited to, Teflon® (E. I. duPont de Nemours and Company, Wilmington, Del.), (polytetrafluoroethylene). Further, the friction reducer 452 may include a low-friction coating (not shown) on all or portions of the mating surfaces of the rack 432. The low-friction coating may include, for example, but not limited to, polytetrafluoroethylene, fluorinated ethylenepropylene, or perfluroralkoxy polymer resin. As will be appreciated by those skilled in the relevant art, other suitable materials may be freely substituted to provide reduced friction.

Figure 36:
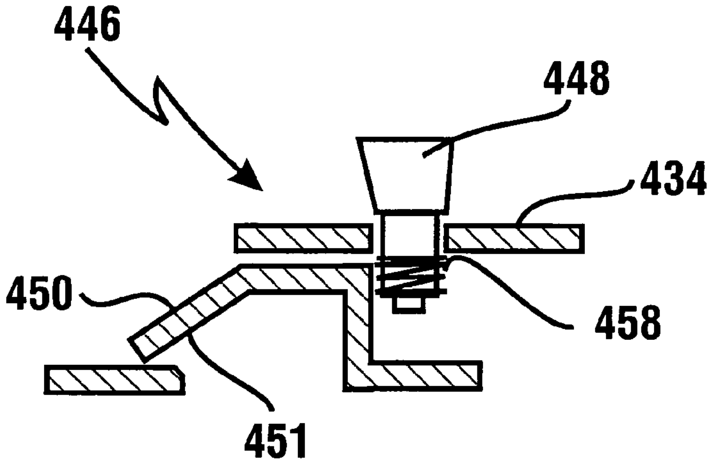
FIG. 36 is a partial section view along the line 36-36 of FIG. 35 illustrating an exemplary release.
Figure 35:
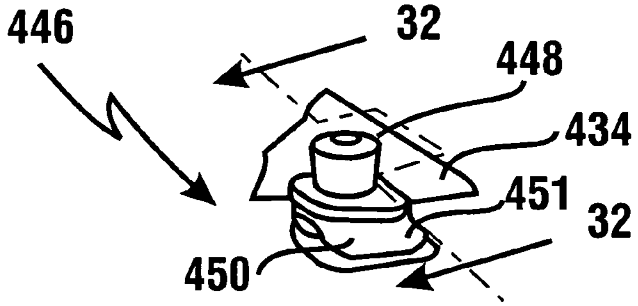
FIG. 35 is an isometric view of the release of the rack of FIG. 24.

As shown in FIG. 24, the moveable member 434 may be retained in the racked-in position (FIG. 22) by an exemplary release 446 comprising a latch 448 and a catch 450. As shown, the latch 448 and the catch 450 cooperate to prohibit the moveable member 434 from sliding out into the racked-out position (FIGS. 23 and 25). Looking at FIGS. 35 and 36, the exemplary release 446 may further comprise a spring 458 and comprise a spring-loaded latch 448. In operation, when a servicer desires to move the receipt printer 430 from the racked-in position (FIG. 24) to the racked-out position (FIG. 23) for servicing, the latch 448 may be lifted in opposition to the spring 458 sufficient for the latch 448 to clear the catch 450. When, following servicing, the servicer desires to return the receipt printer 430 to the racked-in position, the moveable member 434 may be pushed toward the racked-in position. As the latch 448 begins to contact the catch 450, in an exemplary embodiment, the catch 450 comprises an incline 451 which serves to move the latch 448 from an extended position to a withdrawn position and allow the latch 448 to move to the secure position (FIG. 36). As will be appreciated by those skilled in the relevant art, various configurations of the release 446 are possible.

As shown in FIGS. 24 and 25, the moveable member 432 may be held from extending too far beyond the racked-out position by one or more combinations of cooperating stops 438, 440. As shown in exemplary fashion in FIGS. 24 and 25, as the moveable member 432 is moved toward the racked-out position (FIG. 25) the stops 438 of the moveable member 432 will catch on the stops 440 of the fixed member 436 to stop the movement of the moveable member 432 relative to the fixed member 436. By configuring the moveable member stops 438 as flexible tabs, for example, when the moveable member 434 is initially placed onto the fixed member 436, the flexible tabs will ride over the fixed member stops 436 and subsequently return to their original position. The stops 438, 440 may be configured in other ways to effectively accomplish the purpose of prohibiting the moveable member 434 from overextending the fixed member 436.

To facilitate moving the receipt printer 430 from a racked-in position (FIG. 22) to a racked-out position (FIG. 23) for servicing, the moveable member 434 may further include a handle 442.

Figure 37:
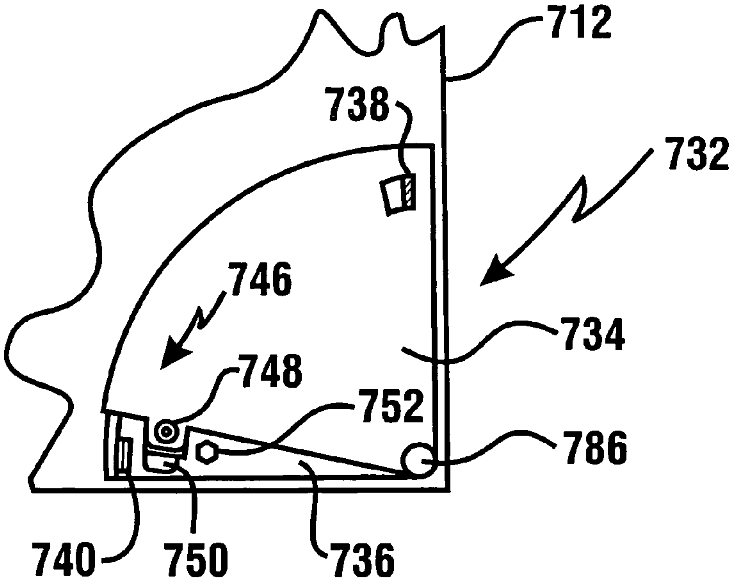
FIG. 37 is a partial plan view of a portion of an automated banking machine of a further exemplary embodiment illustrating a pivotable component rack.

Referring now to FIG. 37, there is shown therein a portion of an automated banking machine of a further exemplary embodiment. In this exemplary embodiment, a top housing 712 includes a component rack 732 mounted thereto. A fixed member 736 is configured to be secured to the top housing 712 in an interior area. The fixed member 736 may include a generally arcuate rail 740 which cooperates with a respective generally arcuate track (not shown, but understood by reference to FIG. 34). A moveable member 734 is pivotably attached to the fixed member 736. In operation, the moveable member 734 is pivoted from a racked-in position wherein an attached serviceable component (not shown) is within the interior area of the top housing 712 to a racked-out position wherein the attached serviceable component is at least partially outside the interior area of the top housing 712. Stops 738 and 740 may be included as may a release 746 comprising a latch 748 and a catch 750 and a friction reducer 752.

Figure 26:
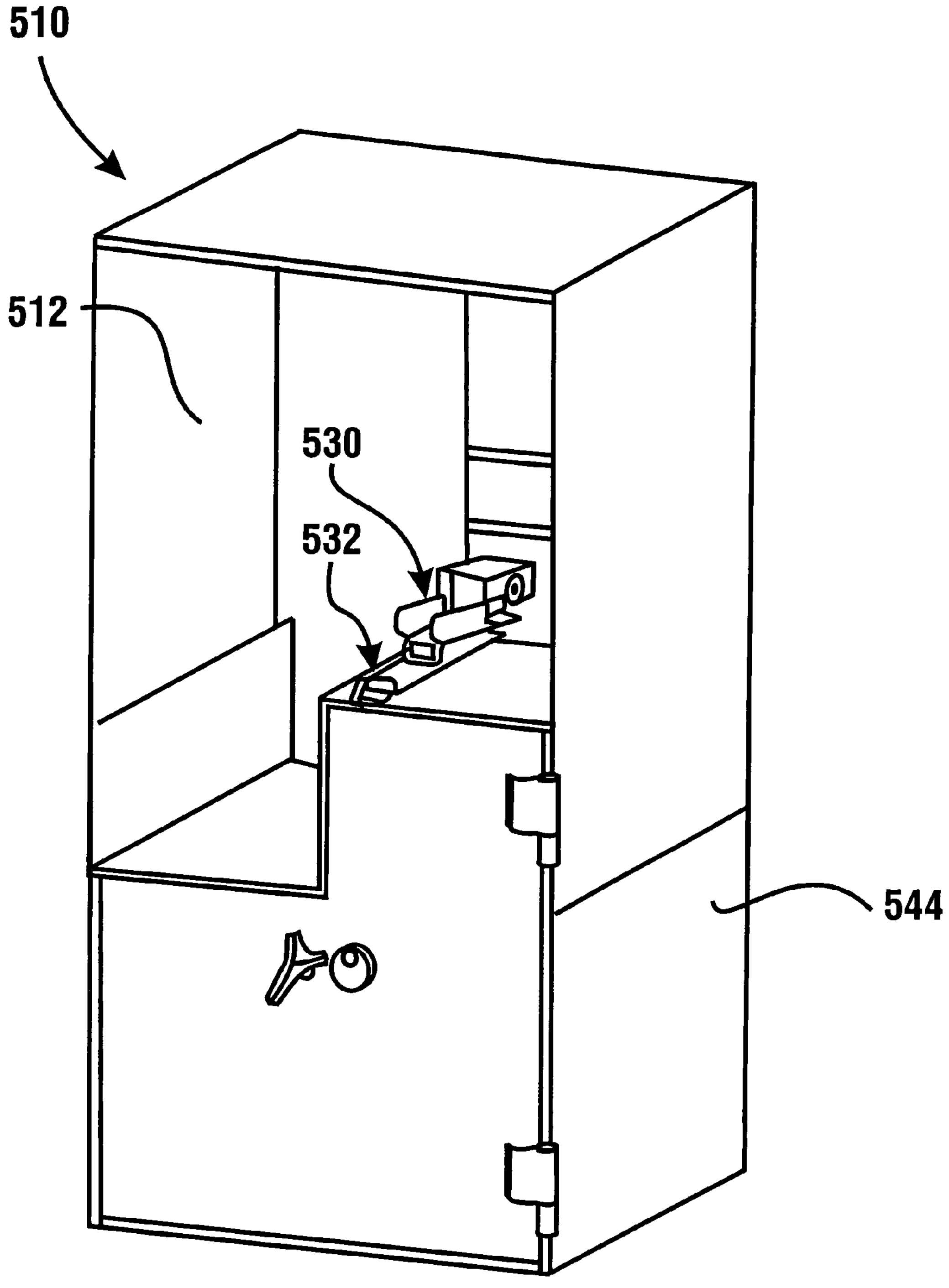
FIG. 26 is an isometric view of an automated banking machine of a further exemplary embodiment illustrating a serviceable component in a racked-in position within the top housing.
Figure 27:
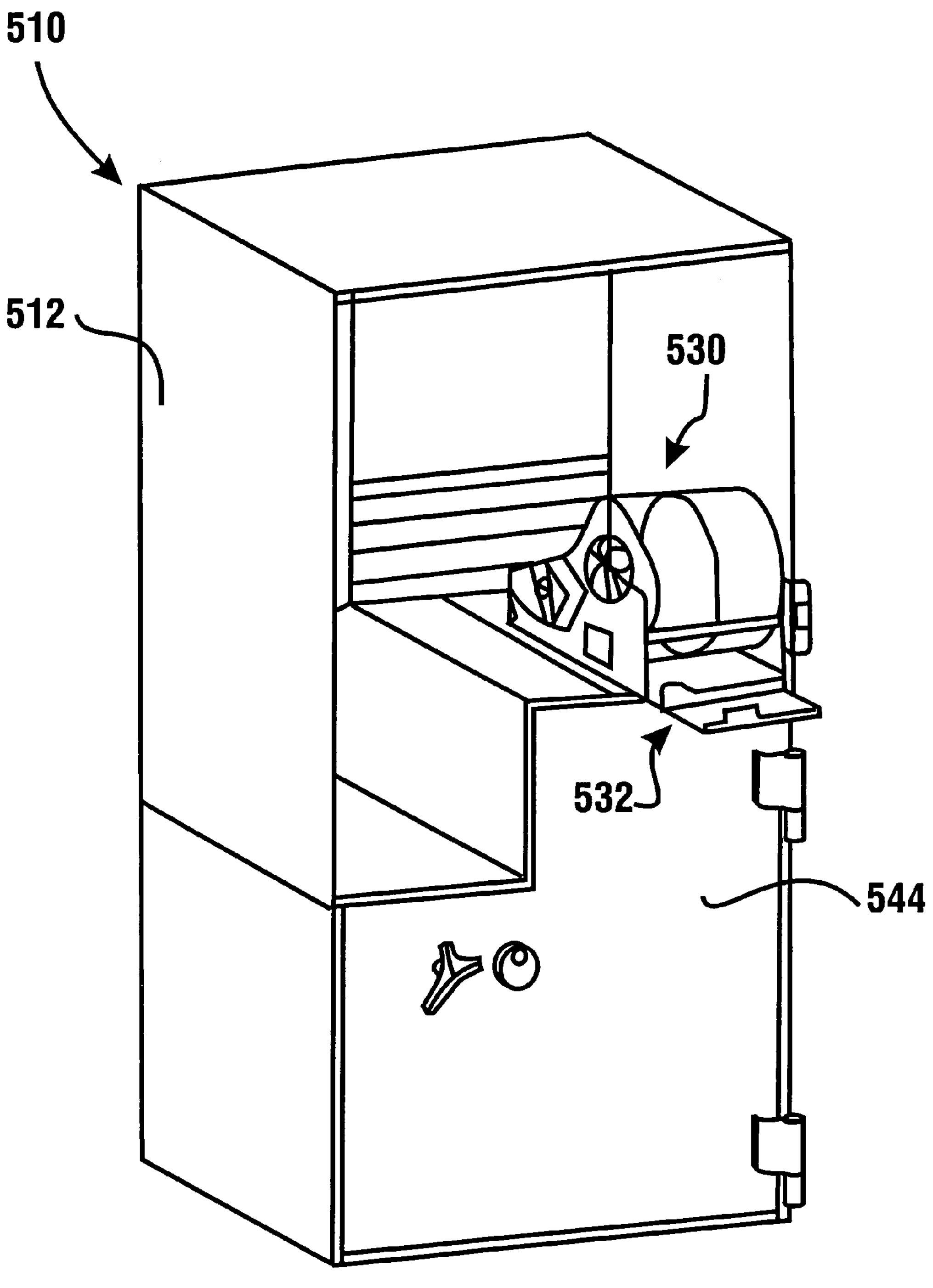
FIG. 27 is an isometric view of the automated banking machine of FIG. 26 illustrating the serviceable component in a racked-out position.

A further exemplary embodiment is shown in FIGS. 26-29. An automated banking machine generally indicated as 510. In this exemplary embodiment, a top housing 512 is mounted on a chest housing 544. The top housing 512 includes an interior area and at least one opening as shown. Also shown in FIGS. 26 and 27 is a statement printer 530 mounted on a statement printer rack 532. To be accessed for servicing, the statement printer 530 may be moved on the statement printer rack 532 from the interior of the top housing 512 to at least partially outside the top housing 512 as shown in FIG. 27.

Figure 28:
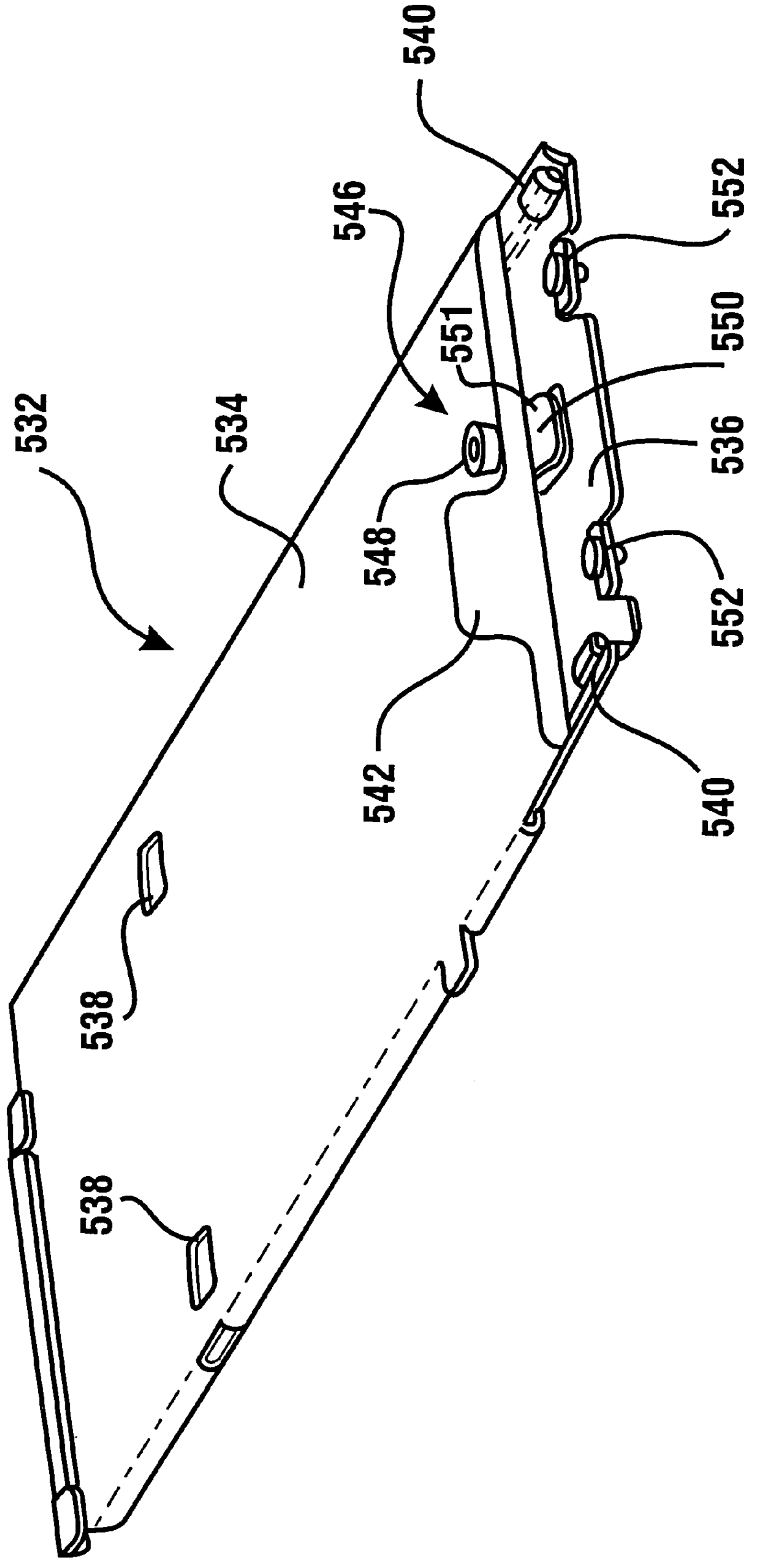
FIG. 28 is an isometric view of the component rack of the automated banking machine of FIG. 26 illustrating the rack in a racked-in position.
Figure 29:
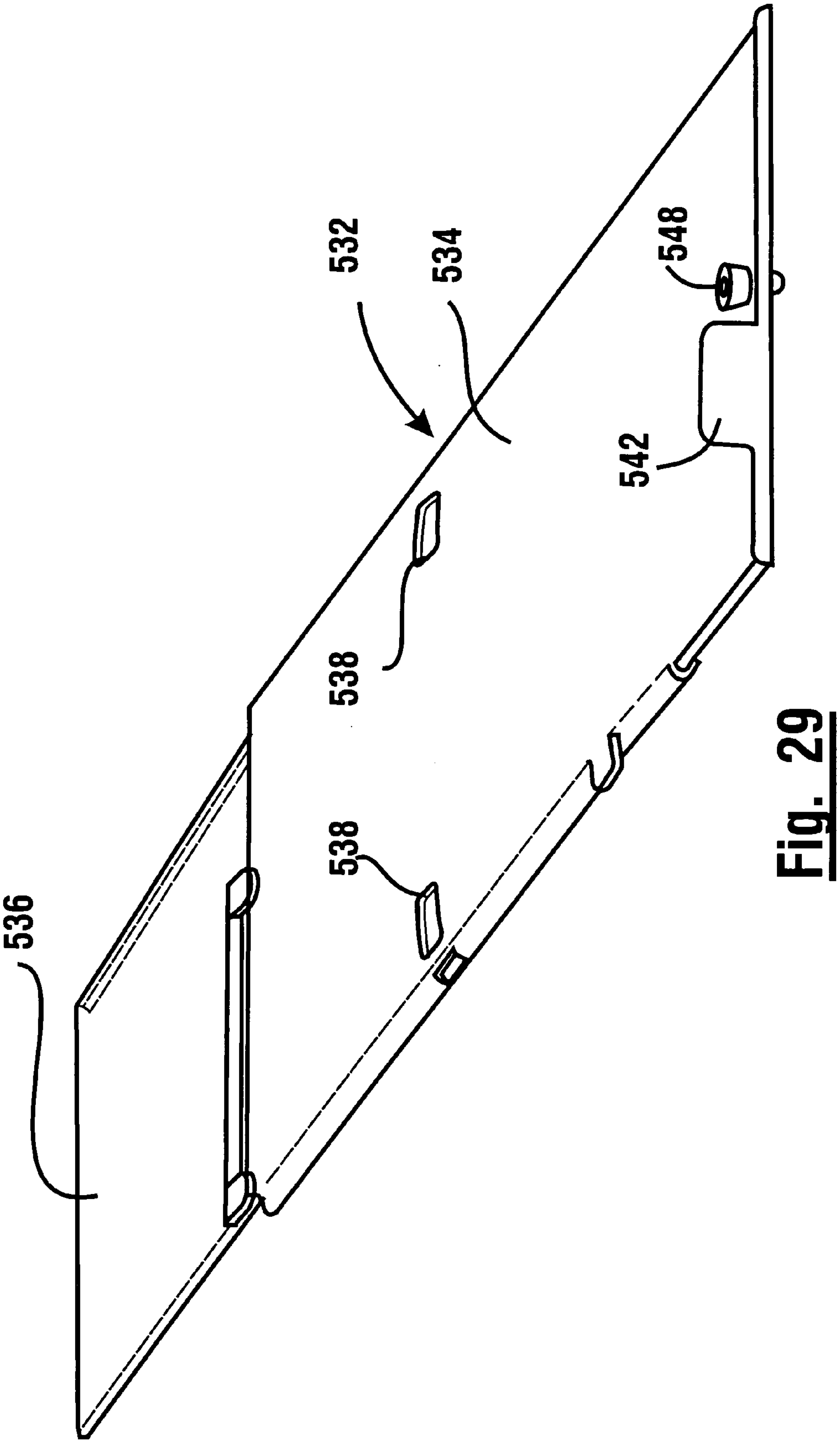
FIG. 29 is an isometric view of the component rack of FIG. 28 illustrating the rack in a racked-out position.
Figure 30:
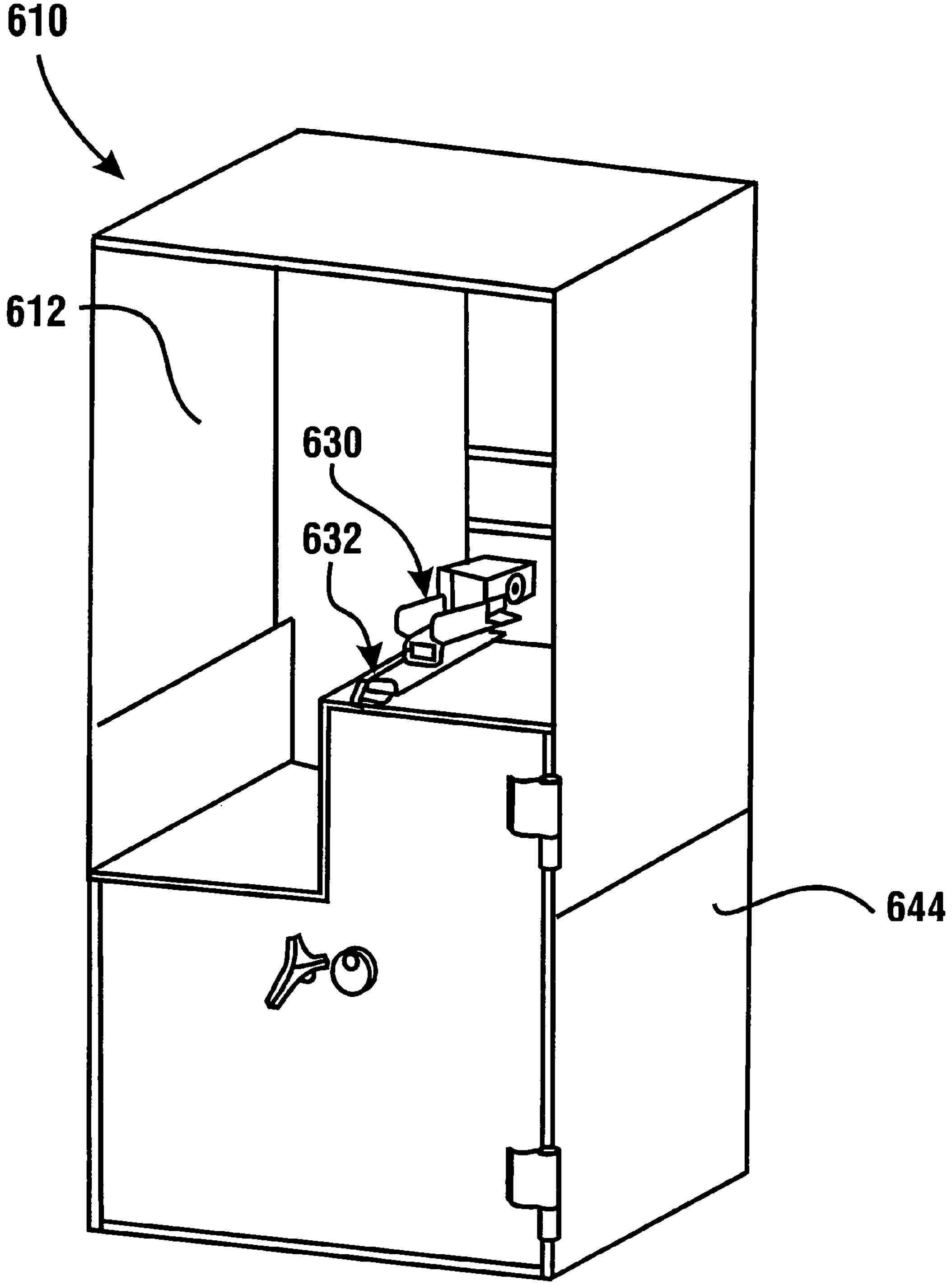
FIG. 30 is an isometric view of an automated banking machine of a further exemplary embodiment illustrating a serviceable component in a racked-in position within the top housing.

Looking more closely at exemplary component rack 532, FIGS. 28 and 29 show various elements. A fixed member 536 is configured to be secured to the top housing 512 in the interior area. The fixed member 536, as shown in exemplary fashion in FIGS. 28 and 29, includes a parallel pair of rails 554 which cooperate with a respective parallel pair of tracks 560 formed in a moveable member 534.

To facilitate movement of the moveable member 534 relative to the fixed member 536, and rack the statement printer 530 to a position for servicing, one or more friction reducers 552 may be included to reduce the drag between the moveable member 534 and the fixed member 536. As shown in exemplary fashion in FIG. 28, the friction reducer 552 may be one or more plastic buttons 552 secured to either the fixed member 536 (as shown in FIG. 28), the moveable member 534, or both. The plastic buttons 552 may be low-friction materials, for example, but not limited to, Teflon® (E. I. duPont de Nemours and Company, Wilmington, Del.), (polytetrafluoroethylene). Further, the friction reducer 552 may include a low-friction coating (not shown) on all or portions of the mating surfaces of the rack 532. The low-friction coating may include, for example, but not limited to, polytetrafluoroethylene, fluorinated ethylenepropylene, or perfluroralkoxy polymer resin. As will be appreciated by those skilled in the relevant art, other suitable materials may be freely substituted to provide reduced friction.

As shown in FIG. 28, the moveable member 534 may be retained in the racked-in position (FIG. 26) by an exemplary release 546 comprising a latch 548 and a catch 550. As shown, the latch 548 and the catch 550 cooperate to prohibit the moveable member 534 from sliding out into the racked-out position (FIGS. 27 and 29). The exemplary release 546 may be similarly formed according to FIGS. 35 and 36. In operation, when a servicer desires to move the statement printer 530 from the racked-in position (FIG. 26) to the racked-out position (FIG. 27) for servicing, the latch 548 may be lifted in opposition to a spring (not shown) sufficient for the latch 548 to clear the catch 550. When, following servicing, the servicer desires to return the statement printer 530 to the racked-in position, the moveable member 534 may be pushed toward the racked-in position. As the latch 548 begins to contact the catch 550, in an exemplary embodiment, the catch 550 comprises an incline 551 which serves to move the latch 548 from an extended position to a withdrawn position and allow the latch 548 to move to the secure position. As will be appreciated by those skilled in the relevant art, various configurations of the release 546 are possible.

As shown in FIGS. 28 and 29, the moveable member 532 may be held from extending too far beyond the racked-out position by one or more combinations of cooperating stops 538, 540. As shown in exemplary fashion in FIGS. 28 and 29, as the moveable member 532 is moved toward the racked-out position (FIG. 29) the stops 538 of the moveable member 532 will catch on the stops 540 of the fixed member 536 to stop the movement of the moveable member 532 relative to the fixed member 536. By configuring the moveable member stops 538 as flexible tabs, for example, when the moveable member 534 is initially placed onto the fixed member 536, the flexible tabs will ride over the fixed member stops 536 and subsequently return to their original position. As will be appreciated by those skilled in the relevant art, the stops 538, 540 may be configured in other ways to effectively accomplish the purpose of prohibiting the moveable member 534 from overextending the fixed member 536.

To facilitate moving the receipt printer 530 from a racked-in position (FIG. 26) to a racked-out position (FIG. 27) for servicing, the moveable member 534 may further include a handle 542.

Figure 31:
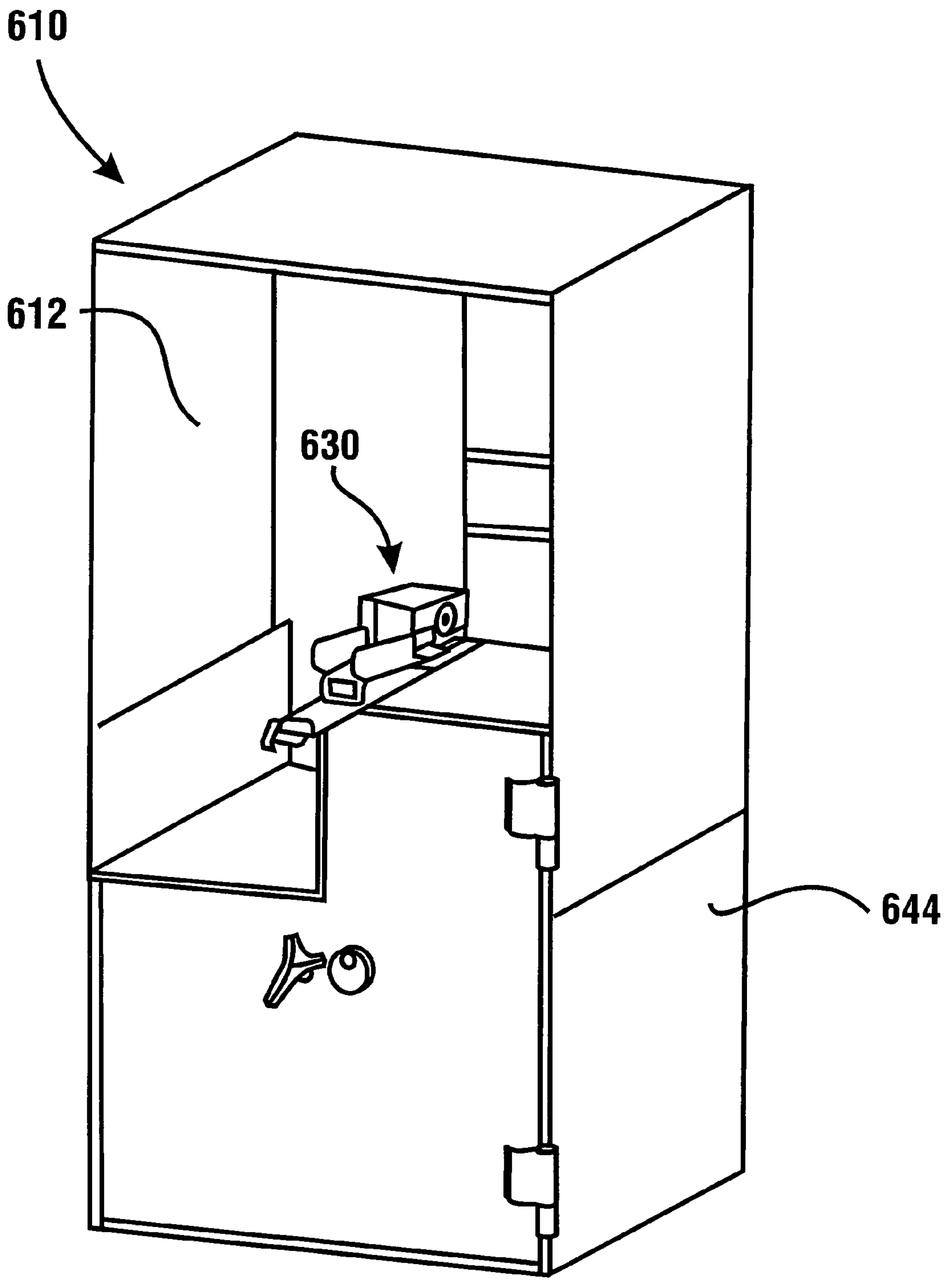
FIG. 31 is an isometric view of the automated banking machine of FIG. 30 illustrating the serviceable component in a racked-out position.

A further exemplary embodiment is shown in FIGS. 30-33. An automated banking machine generally indicated as 610. In this exemplary embodiment, a top housing 612 is mounted on a chest housing 644. The top housing 612 includes an interior area and at least one opening as shown. Also shown in FIGS. 26 and 27 is a card reader 630 mounted on a card reader rack 632. To be accessed for servicing, the card reader 630 may be moved on the card reader rack 632 from the interior of the top housing 612 to at least partially outside the top housing 612 as shown in FIG. 31.

Figure 32:
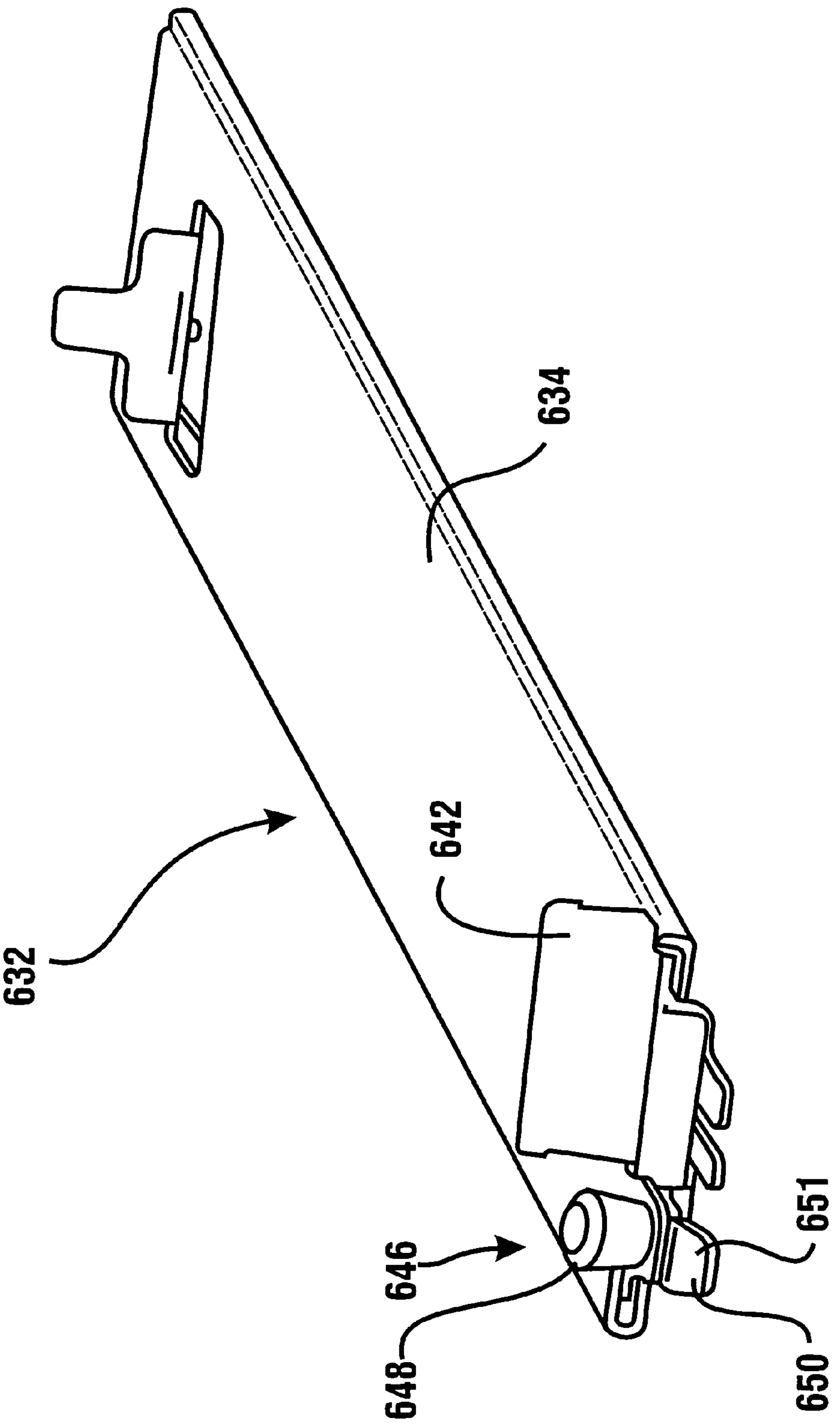
FIG. 32 is an isometric view of the component rack of the automated banking machine of FIG. 30 illustrating the rack in a racked-in position.
Figure 33:
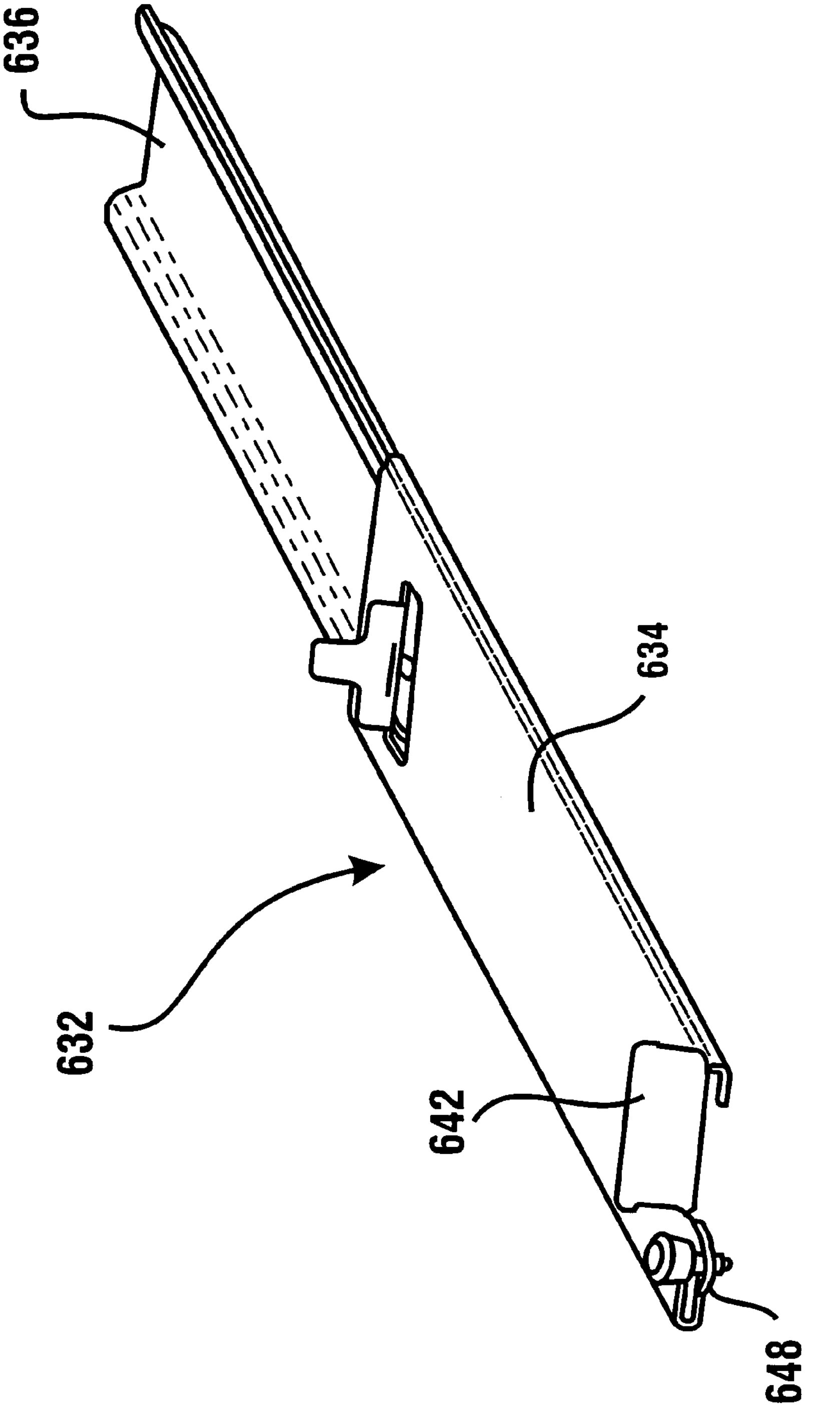
FIG. 33 is an isometric view of the component rack of FIG. 32 illustrating the rack in a racked-out position.

Looking more closely at exemplary component rack 632, FIGS. 32 and 33 show various elements. A fixed member 636 is configured to be secured to the top housing 612 in the interior area. The fixed member 636, as shown in exemplary fashion in FIGS. 32 and 33, includes a parallel pair of rails 654 which cooperate with a respective parallel pair of tracks 660 formed in a moveable member 634.

To facilitate movement of the moveable member 634 relative to the fixed member 636, and rack the card reader 630 to a position for servicing, one or more friction reducers 652 may be included to reduce the drag between the moveable member 634 and the fixed member 636. As shown in exemplary fashion in FIG. 32, the friction reducer 652 may be one or more plastic buttons 652 secured to either the fixed member 636 (as shown in FIG. 32), the moveable member 634, or both. The plastic buttons 652 may be low-friction materials, for example, but not limited to, Teflon® (E. I. duPont de Nemours and Company, Wilmington, Del.), (polytetrafluoroethylene). Further, the friction reducer 652 may include a low-friction coating (not shown) on all or portions of the mating surfaces of the rack 632. The low-friction coating may include, for example, but not limited to, polytetrafluoroethylene, fluorinated ethylenepropylene, or perfluroralkoxy polymer resin. As will be appreciated by those skilled in the relevant art, other suitable materials may be freely substituted to provide reduced friction.

As shown in FIG. 32, the moveable member 634 may be retained in the racked-in position (FIG. 30) by an exemplary release 646 comprising a latch 648 and a catch 650. As shown, the latch 648 and the catch 650 cooperate to prohibit the moveable member 634 from sliding out into the racked-out position (FIGS. 31 and 33). The exemplary release 646 may be similarly formed according to FIGS. 35 and 36. In operation, when a servicer desires to move the statement printer 630 from the racked-in position (FIG. 30) to the racked-out position (FIG. 31) for servicing, the latch 648 may be lifted in opposition to a spring (not shown) sufficient for the latch 648 to clear the catch 650. When, following servicing, the servicer desires to return the card reader 630 to the racked-in position, the moveable member 634 may be pushed toward the racked-in position. As the latch 648 begins to contact the catch 650, in an exemplary embodiment, the catch 650 comprises an incline 651 which serves to move the latch 648 from an extended position to a withdrawn position and allow the latch 648 to move to the secure position. As will be appreciated by those skilled in the relevant art, various configurations of the release 646 are possible.

As shown in FIGS. 32 and 33, the moveable member 632 may be held from extending too far beyond the racked-out position by one or more combinations of cooperating stops 638, 640. As shown in exemplary fashion in FIGS. 32 and 33, as the moveable member 632 is moved toward the racked-out position (FIG. 33) the stops 638 of the moveable member 632 will catch on the stops 640 of the fixed member 636 to stop the movement of the moveable member 632 relative to the fixed member 636. By configuring the moveable member stops 638 as flexible tabs, for example, when the moveable member 634 is initially placed onto the fixed member 636, the flexible tabs will ride over the fixed member stops 636 and subsequently return to their original position. As will be appreciated by those skilled in the relevant art, the stops 638, 640 may be configured in other ways to effectively accomplish the purpose of prohibiting the moveable member 634 from overextending the fixed member 636.

To facilitate moving the card reader 630 from a racked-in position (FIG. 30) to a racked-out position (FIG. 31) for servicing, the moveable member 634 may further include a handle 642.

Figure 38:
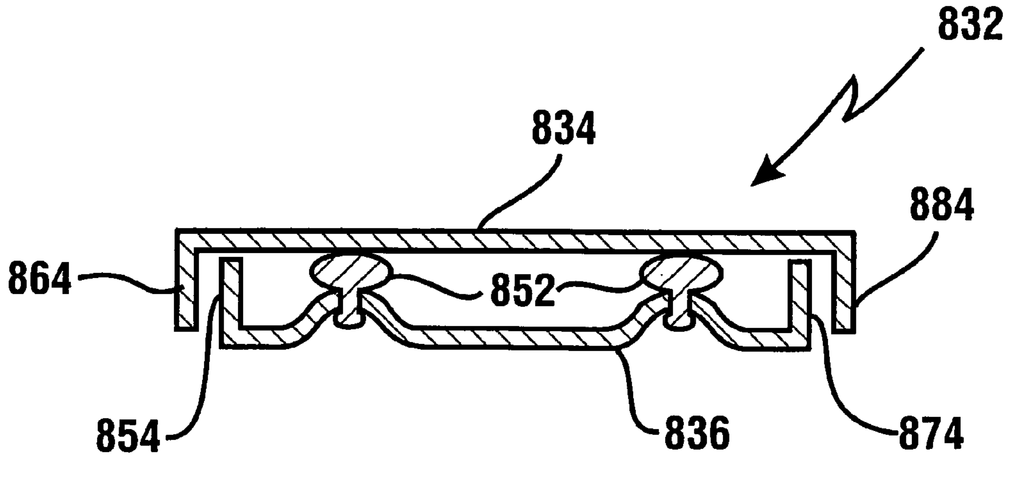
FIG. 38 is a partial section view illustrating an exemplary rack configuration.

Turning now to FIG. 38, a further exemplary rack 832 is shown. The exemplary rack 832 comprises a fixed member 836 and a moveable member 834. The fixed member 836 further comprises a pair of rails 854, 874. The moveable member 834 further comprises a pair of rails 864, 884 which cooperate with the fixed member rails 854, 874 to limit lateral movement of the moveable member 834 relative to the fixed member 836 while allowing front-to-back relative movement. Also shown in FIG. 38 in exemplary fashion are a two friction reducers 853 which may be plastic buttons.

An exemplary method for constructing a banking machine or portion thereof is provided. In the exemplary method, a first rail is formed along at least a portion of a first side of a first panel. By way of example only, the panel may comprise light-gauge sheet metal and the rail formed by bending the first side of the first panel to form the rail. The rail may also be formed by conventional roll forming. The rail may also be formed by stamping the panel. This latter method has the further advantage of enabling the simultaneous formation one or more stops, a catch, a friction reducer mount, or combinations thereof. By way of further example only, the panel may comprise a suitable plastic and be molded or extruded. In the exemplary method, a first track is formed along at least a portion of a first side of a second panel. As with the first panel, light-gauge sheet metal may be used and the track formed by bending the first side of the second panel to form the track. The track may also be formed by conventional roll forming or by stamping. By way of further example only, the panel may comprise a suitable plastic and be molded or extruded.

The exemplary method includes securing the first panel to the interior of a housing adapted for use with an automated banking machine. The automated banking machine further comprises a card reader in operatively-supported connection with the housing, wherein the card reader is operative to read indicia on user cards corresponding to financial accounts. The automated banking machine further comprises a display in operatively-supported connection with the housing, and a cash dispenser in operatively-supported connection with the housing.

The exemplary method includes slidably mounting the second panel to the first panel and mounting at least one serviceable automated banking machine component to the second panel.

The exemplary method may further include forming a second rail along at least a portion of a second, opposite side of the first panel and forming a second track along at least a portion of a second, opposite side of the second panel.

The exemplary method may further include interposing at least one friction reducer between the first panel and the second panel and securing the at least one friction reducer to the first panel, the second panel, or both. By way of example only, the method may comprise securing at least one plastic bearing. By way of further example only, the method may comprise applying a low-friction coating to at least a portion of the first panel, the second panel, or both.

The exemplary method may further include securing a catch to the first panel and securing a latch to the second panel.

The exemplary method may further include forming the first panel with a first stop and forming the second panel with a second stop.

The exemplary method may further include forming the second panel so as to include a handle.

Exemplary embodiments may also include features described in U.S. Pat. Nos. 7,255,266; 7,251,626; 7,249,761; 7,246,082; 7,240,829; 7,240,827; 7,234,636; 7,229,009; 7,229,012; 7,229,008; 7,222,782; 7,216,801; 7,216,800; 7,216,083; 7,207,478; 7,204,411; 7,195,153; and 7,195,237 the disclosures of each of which are incorporated herein by reference.

While the exemplary embodiments include particular structures or steps to achieve the desirable results, those having skill in the art may devise numerous other embodiments with other structures or steps which employ the same inventive principles described herein and which are encompassed by the subject matter as claimed.

Thus, the exemplary embodiments achieve at least some of the above stated objectives, eliminate difficulties encountered in the making and use of prior devices, solve problems, and attain the desirable results described herein.

In the foregoing description certain terms have been used for brevity, clarity, and understanding. However, no unnecessary limitations are to be implied therefrom because such terms are for descriptive purposes and are intended to be broadly construed. Moreover, the descriptions and illustrations herein are given by way of examples and the invention is not limited to the exact details shown and described.

In the following claims any feature described as a means for performing a function will be construed as encompassing any means known to those having skill in the art as capable of performing the recited function, and will not be deemed limited to the particular means shown as performing that function in the foregoing description or mere equivalents thereof.

Having described the features, discoveries, and principles of the invention, the manner in which it is constructed and operated, and the advantages and useful results attained; the new and useful structures, devices, elements, arrangements, parts, combinations, systems, operations, methods, and relationships are set forth in the appended claims.

We claim:

1. Apparatus comprising:

an automated banking machine including:

a housing, a card reader in operatively-supported connection with the housing, wherein the card reader is operative to read indicia on user cards corresponding to financial accounts,
a cash dispenser in operatively-supported connection with the housing,
a fascia,
wherein the fascia is movably mounted in operatively-supported connection with the housing,
wherein the fascia includes at least one journal printer assembly support bracket, wherein the at least one journal printer assembly support bracket includes a first portion,
a display in operatively-supported connection with the housing,
wherein the display is viewable through an opening in the fascia,
a journal printer assembly,
wherein the journal printer assembly includes a print head, a paper supply, and a paper take-up,
wherein the journal printer assembly is mounted to the fascia in operatively supported connection therewith,
wherein the journal printer assembly includes at least one outwardly extending portion,
wherein during the operatively supported connection,
a first portion of a support bracket of the at least one journal printer assembly support bracket
and
an outwardly extending portion of the at least one outwardly extending portion
cooperate to cause the journal printer assembly to be held adjacent to the fascia.

2. The apparatus of claim 1,
wherein the journal printer assembly is mounted in a vertical position,
wherein the paper supply and the paper take-up are in an above-and-below relation with the print head.

3. The apparatus of claim 1, wherein the paper supply comprises a paper supply roll.

4. The apparatus of claim 3, further including a paper supply roll tensioner in operatively-supported connection with the journal printer assembly and in operative connection with the paper supply roll, wherein the paper supply roll tensioner is operative to urge the paper supply roll toward a rolled-up direction.

5. The apparatus of claim 1,
wherein the paper take-up comprises a paper take-up roll,
and further comprising a paper take-up roll tensioner in operatively supported connection with the journal printer assembly and in operative connection with the paper take-up roll,
wherein the paper take-up roll tensioner is operative to urge the paper take-up roll toward a rolled-up direction.

6. The apparatus of claim 1, wherein the print head is operative to print indicia comprising at least one of automated banking machine status data and automated banking machine financial transactions data.

7. The apparatus of claim 6,
wherein the print head comprises a thermal print head,
wherein the paper supply comprises thermochromic paper,
wherein the thermal print head is operative to print on the thermochromic paper the indicia comprising the at least one of automated banking machine status and automated banking machine financial transactions data.

8. The apparatus of claim 1,
wherein the automated banking machine includes a receipt printer,
wherein the receipt printer is mounted in operatively-supported connection with the fascia, and
wherein the journal printer assembly is positioned above the receipt printer.

9. The apparatus of claim 1,
wherein the fascia is movable between
a closed position adjacent the housing and
an away position wherein the fascia is at least partially separated from the housing.

10. The apparatus of claim 1,
wherein the fascia is operatively supported by the housing through two horizontally-disposed members,
wherein the two horizontally-disposed members include bayonet slides.

11. The apparatus of claim 1,
wherein the journal printer assembly includes a journal printer housing,
wherein the journal printer housing at least partially encloses the print head, the paper supply, and the paper take-up.

12. The apparatus of claim 11,
wherein the journal printer housing includes an aperture,
wherein the journal printer assembly includes at least one input device,
wherein the journal printer housing at least partially encloses the at least one input device,
wherein the aperture is positioned to enable manual access therethrough to the at least one input device.

13. The apparatus of claim 12,
wherein the at least one input device is operative responsive to manual actuation, to cause at least one of
paper advance and
output through at least one status indicator.

14. The apparatus of claim 13,
wherein the journal printer assembly includes the at least one status indicator,
wherein the at least one status indicator is operative to provide at least one output indicative of at least one of out-of-paper, paper jam, and paper tear.

15. The apparatus of claim 14,
wherein the fascia includes a fascia panel,
wherein the fascia panel includes a fascia panel aperture,
wherein the fascia panel aperture is positioned relative to the aperture of the journal printer housing to enable access to at least one of
the at least one input device and
the at least one status indicator
through both the fascia panel aperture and the aperture of the journal printer housing.

16. The apparatus of claim 1,
wherein the first portion of the support bracket of the at least one journal printer assembly support bracket comprises a horizontal channel, and
wherein the outwardly extending portion of the at least one outwardly extending portion comprises an assembly extension.

17. The apparatus of claim 1,
wherein the first portion of the support bracket of the at least one journal printer assembly support bracket comprises a keyhole channel, and
wherein the outwardly extending portion of the at least one outwardly extending portion comprises a key extension.

18. An apparatus comprising:

an automated banking machine, wherein the automated banking machine includes a machine housing, wherein the automated banking machine includes a fascia, wherein the automated banking machine includes at least one reader device operative to read user data, wherein the at least one reader device includes a card reader operative to read from user cards, indicia corresponding to financial accounts, wherein the automated banking machine includes a cash dispenser in operatively supported connection with the machine housing, wherein the automated banking machine includes a journal printer assembly mounted to the fascia in operatively supported connection therewith, wherein the journal printer assembly includes a journal printer, a journal printer housing comprising an aperture, and at least one indicator operable to provide at least one visual output, wherein the journal printer includes at least one input device, wherein the fascia includes a fascia panel, wherein the fascia panel includes a fascia panel aperture, wherein the fascia panel aperture permits visual access therethrough to the at least one indicator, wherein the fascia panel aperture permits manual access therethrough to the at least one input device, wherein the manual access allows manually causing at least one of paper advancement, and output through the at least one indicator, wherein the fascia is movable away from the machine housing during a servicing of the machine to allow the at least one indicator to be visually accessible through both the fascia panel aperture and the aperture, and the at least one input device to be manually accessible through both the fascia panel aperture and the aperture.

19. The apparatus of claim 18 wherein the aperture comprises a journal printer housing aperture, wherein the journal printer housing aperture is substantially aligned with the fascia panel aperture.

20. The apparatus of claim 18 wherein the at least one input device includes a paper advance device.

21. The apparatus of claim 18 wherein the at least one indicator includes at least one status indicator, wherein the at least one status indicator is operable to indicate at least one of an out-of-paper condition, a paper jam condition, and a paper tear condition.

22. The apparatus of claim 18 wherein the journal printer housing houses a print head, a paper supply roll, and a paper take-up roll, wherein the journal printer is operable to print indicia representative of automated banking machine status data.

23. The apparatus of claim 18 wherein the fascia is movable away from the machine housing to allow the at least one input device to be manually accessible via an access tool through both the fascia panel aperture and the aperture.

24. An apparatus comprising:

an automated banking machine, wherein the automated banking machine includes a machine housing, wherein the automated banking machine includes a fascia, wherein the automated banking machine includes at least one reader device operative to read user data, wherein the at least one reader device includes a card reader operative to read from user cards, indicia corresponding to financial accounts, wherein the automated banking machine includes a cash dispenser in operatively supported connection with the machine housing, wherein the automated banking machine includes a journal printer assembly mounted in operatively supported connection to the fascia, wherein the journal printer assembly includes a journal printer and a printer housing, wherein the printer housing includes an aperture positioned to enable access therethrough to at least one input device of the journal printer, wherein the fascia includes a fascia panel, wherein the fascia panel includes a fascia panel aperture, wherein the fascia panel aperture enables access therethrough to the at least one input device, wherein the fascia is movable away from the machine housing, wherein with the fascia moved away from the machine housing, the at least one input device is manually accessible through both the fascia panel aperture and the aperture during servicing of the journal printer.

25. The apparatus of claim 24 wherein the journal printer assembly is removably attached to the fascia through an attachment arrangement, wherein the attachment arrangement allows the journal printer assembly to be separated from the fascia.

26. The apparatus of claim 25 wherein the attachment arrangement allows the journal printer assembly to be subsequently reattached to the fascia.

27. The apparatus of claim 24 wherein having the fascia moved away from the machine housing allows for manually servicing the journal printer to at least one of:

install a paper supply roll, remove a paper take-up roll, adjust a printer head, clear a paper jam, adjust a paper roll tensioner, and inspect printed indicia produced through operation of the journal printer.

* * * * *